US012707400B2

(12) United States Patent
Farag

(10) Patent No.: US 12,707,400 B2
(45) Date of Patent: Aug. 11, 2026

(54) SL POWER CONTROL

(71) Applicant: Samsung Electronics Co., Ltd., Suwon-si (KR)

(72) Inventor: Emad Nader Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 18/416,710

(22) Filed: Jan. 18, 2024

(65) Prior Publication Data

US 2024/0284343 A1 Aug. 22, 2024

Related U.S. Application Data

(60) Provisional application No. 63/457,681, filed on Apr. 6, 2023, provisional application No. 63/442,968, filed on Feb. 2, 2023.

(51) Int. Cl.
*H04B 7/00* (2006.01)
*H04W 52/24* (2009.01)

(52) U.S. Cl.
CPC ....... *H04W 52/242* (2013.01); *H04W 52/245* (2013.01)

(58) Field of Classification Search
CPC . H04W 52/04; H04W 52/143; H04W 52/146; H04W 52/226; H04W 52/242; H04W 52/327; H04B 1/38
See application file for complete search history.

(56) References Cited

U.S. PATENT DOCUMENTS

2021/0051600 A1* 2/2021 Fakoorian ........... H04W 52/245
2021/0136699 A1 5/2021 Scholand et al.
2022/0330038 A1 10/2022 Ganesan et al.
2022/0386247 A1 12/2022 Liu et al.
2023/0180132 A1* 6/2023 Wang .................... H04W 76/14 370/318
2024/0089869 A1* 3/2024 Manolakos ......... H04W 52/383

FOREIGN PATENT DOCUMENTS

WO 2021026386 A1 2/2021

OTHER PUBLICATIONS

International Search Report issued May 3, 2024 regarding International Application No. PCT/KR2024/001525, 4 pages.

(Continued)

*Primary Examiner* — Tuan Pham

(57) ABSTRACT

Methods and apparatuses for sidelink (SL) power control. A user equipment (UE) includes a transceiver configured to receive, from a second UE, a first sidelink (SL) reference signal (RS) and receive, from the second UE, information related to a transmit power for the first SL RS. The UE further includes a processor operably coupled to the transceiver. The processor is configured to calculate a first filtered RS receive power (RSRP) for the first SL RS, calculate a first pathloss for the first SL RS based on a difference between the transmit power and the first filtered RSRP, and determine, based on the first pathloss, a first power for a first SL channel. The transceiver is further configured to transmit, based on a first spatial domain transmission filter, the first SL channel using the first power. The first spatial domain transmission filter is associated with the first SL RS.

20 Claims, 10 Drawing Sheets

(56) References Cited

OTHER PUBLICATIONS

"5G; NR; Physical channels and modulation (3GPP TS 38.211 version 17.6.0 Release 17)", ETSI TS 138 211 V17.6.0, Oct. 2023, 140 pages.
"5G; NR; Multiplexing and channel coding (3GPP TS 38.212 version 17.6.0 Release 17)", ETSI TS 138 212 V17.6.0, Oct. 2023, 206 pages.
"5G; NR; Physical layer procedures for control (3GPP TS 38.213 version 17.7.0 Release 17)", ETSI TS 138 213 V17.7.0, Oct. 2023, 268 pages.
"5G; NR; Physical layer procedures for data (3GPP TS 38.214 version 17.7.0 Release 17)", ETSI TS 138 214 V17.7.0, Oct. 2023, 236 pages.
"5G; NR; Medium Access Control (MAC) protocol specification (3GPP TS 38.321 version 17.6.0 Release 17)", ETSI TS 138 321 V17.6.0, Oct. 2023, 255 pages.
"5G; NR; Radio Resource Control (RRC); Protocol specification (3GPP TS 38.331 version 17.6.0 Release 17)", ETSI TS 138 331 V17.6.0, Oct. 2023, 1309 pages.
"3rd Generation Partnership Project; Technical Specification Group Radio Access Network; Evolved Universal Terrestrial Radio Access (E-UTRA); Physical layer procedures (Release 17)", 3GPP TS 36.213 V17.6.0, Dec. 2023, 584 pages.

* cited by examiner

SL POWER CONTROL

CROSS-REFERENCE TO RELATED APPLICATIONS AND CLAIM OF PRIORITY

The present application claims priority to U.S. Provisional Patent Application No. 63/442,968, filed on Feb. 2, 2023, and U.S. Provisional Patent Application No. 63/457,681, filed on Apr. 6, 2023. The contents of the above-identified patent documents are incorporated herein by reference.

TECHNICAL FIELD

The present disclosure relates generally to wireless communication systems and, more specifically, the present disclosure relates to sidelink (SL) power control in frequency range 2 (FR2) in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to SL power control in FR2 in a wireless communication system.

In one embodiment, a user equipment (UE) is provided. The UE includes a transceiver configured to receive, from a second UE, a first SL reference signal (RS) and receive, from the second UE, information related to a transmit power for the first SL RS. The UE further includes a processor operably coupled to the transceiver. The processor is configured to calculate a first filtered RS receive power (RSRP) for the first SL RS, calculate a first pathloss for the first SL RS based on a difference between the transmit power and the first filtered RSRP, and determine, based on the first pathloss, a first power for a first SL channel. The transceiver is further configured to transmit, based on a first spatial domain transmission filter, the first SL channel using the first power. The first spatial domain transmission filter is associated with the first SL RS.

In another embodiment, a method of operating a UE is provided. The method includes receiving, from a second UE, a first SL RS; receiving, from the second UE, information related to a transmit power for the first SL RS; calculating a first filtered RSRP for the first SL RS; and calculating a first pathloss for the first SL RS based on a difference between the transmit power and the first filtered RSRP. The method further includes determining, based on the first pathloss, a first power for a first SL channel and transmitting based on a first spatial domain transmission filter, the first SL channel using the first power. The first spatial domain transmission filter is associated with the first SL RS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.6.0, "NR; Physical channels and modulation"; 3GPP TS 38.212 v17.6.0, "NR; Multiplexing and Channel coding"; 3GPP TS 38.213 v17.7.0, "NR; Physical Layer Procedures for Control"; 3GPP TS 38.214 v17.7.0, "NR; Physical Layer Procedures for Data"; 3GPP TS 38.321 v17.6.0, "NR; Medium Access Control (MAC) protocol specification"; 3GPP TS 38.331 v17.6.0, "NR; Radio Resource Control (RRC) Protocol Specification"; and 3GPP TS 36.213 v17.6.0, "Evolved Universal Terrestrial Radio Access (E-UTRA); Physical layer procedures."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
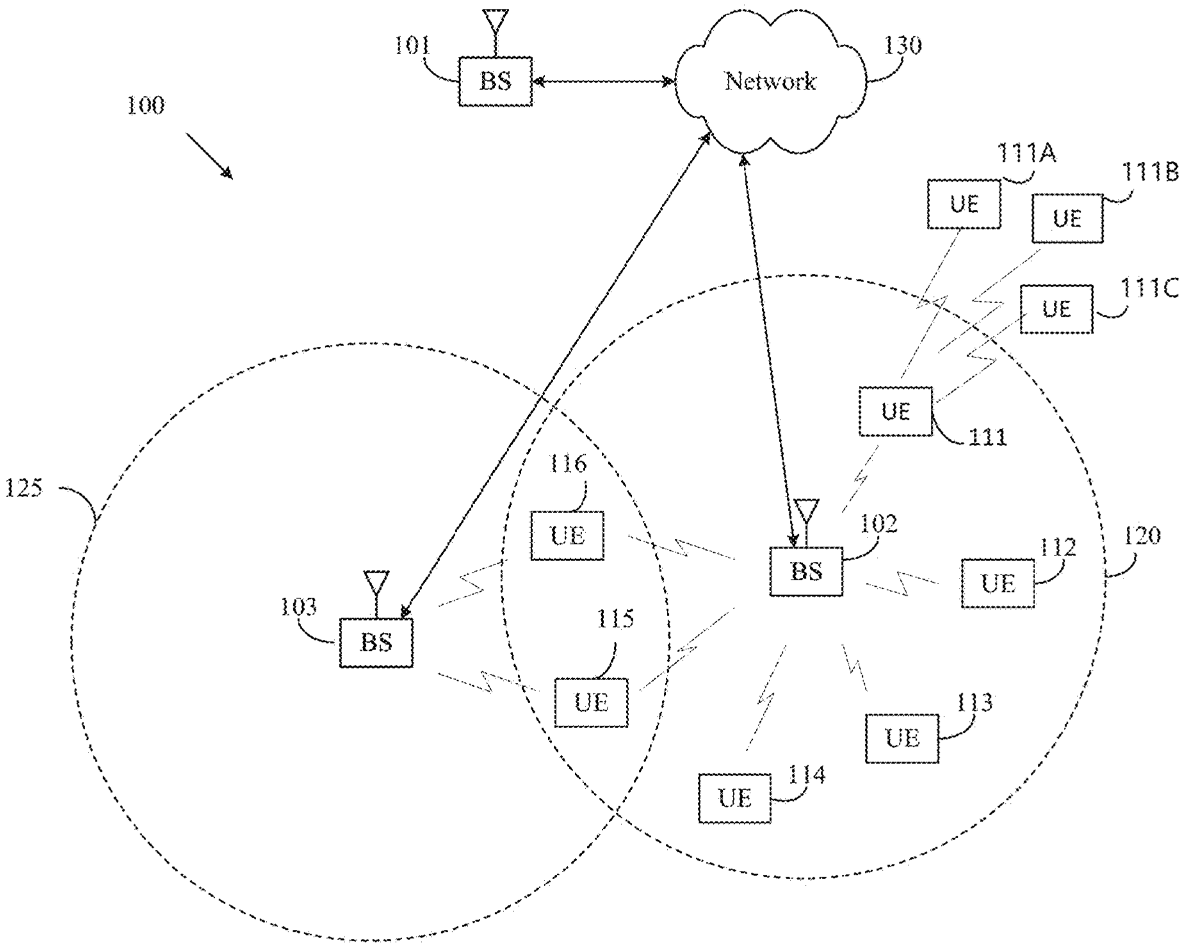
FIG. 1 illustrates an example of wireless network according to embodiments of the present disclosure.
Figure 2:
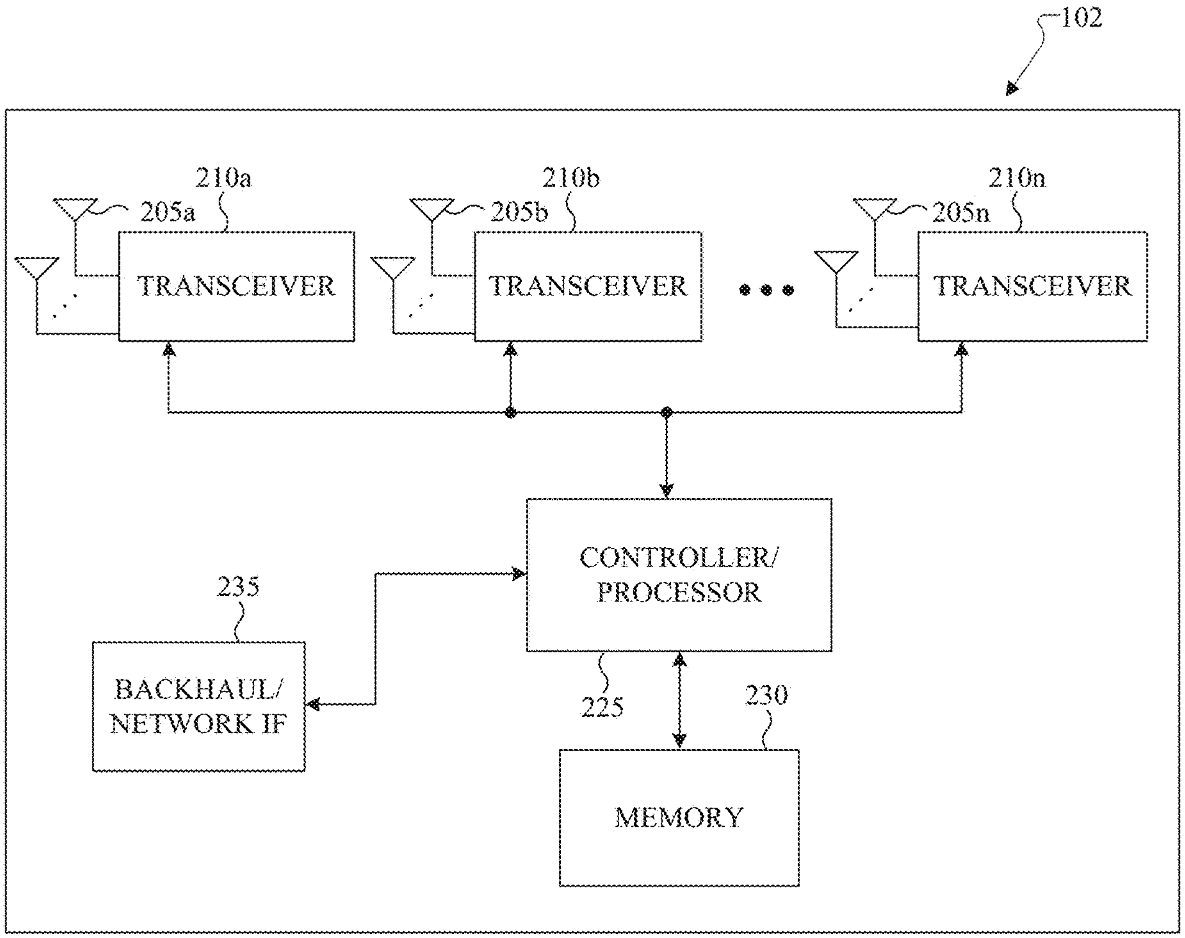
FIG. 2 illustrates an example of gNB according to embodiments of the present disclosure.
Figure 3:
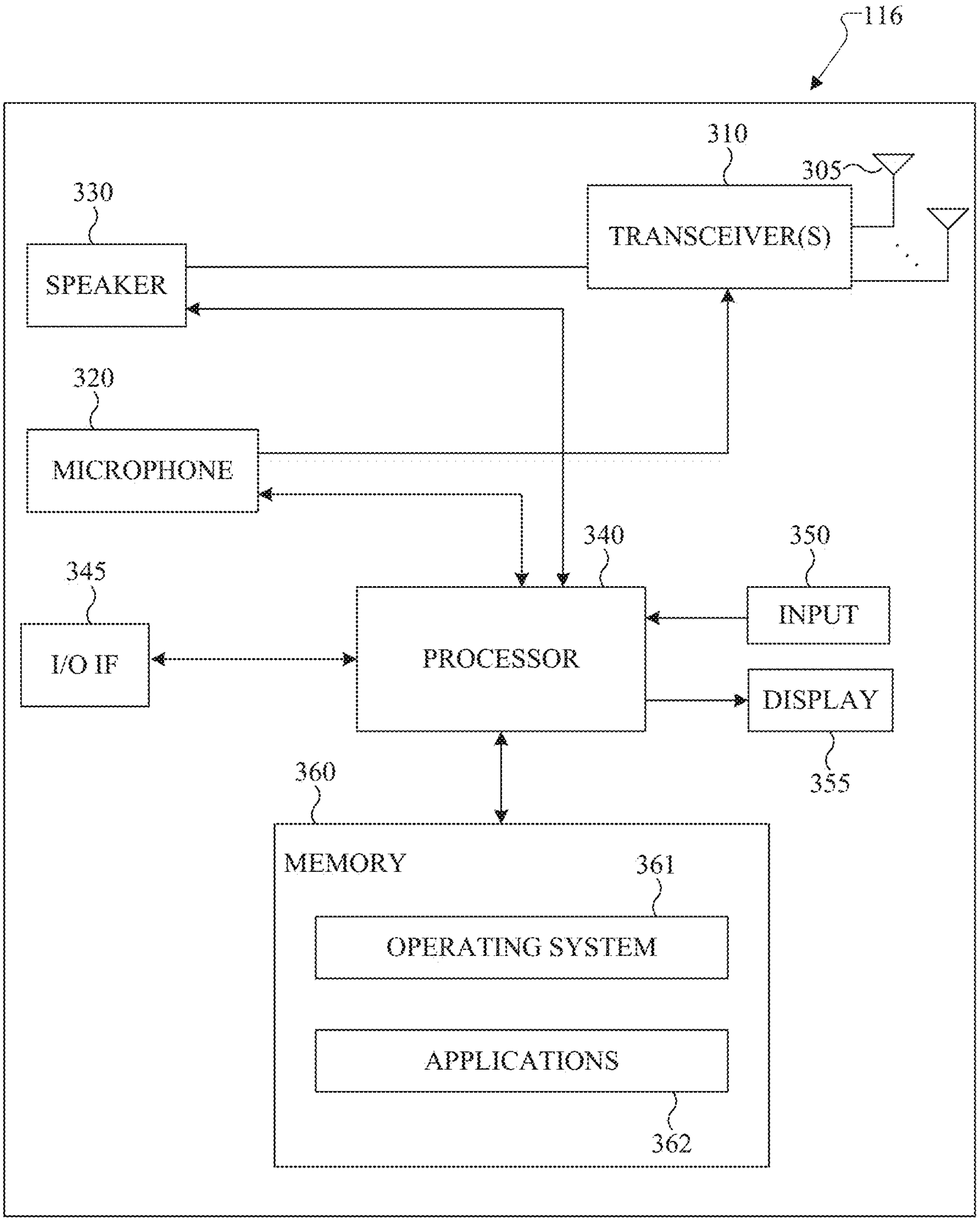
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UEs are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a SL power control in FR2 in a wireless communication system. In certain embodiments, and one or more of the gNBs 101-103 includes circuitry, programing, or a combination thereof, for supporting a SL power control in FR2 in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channels or signals and the transmission of DL channels or signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for supporting a SL power control in FR2 in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channels or signals, the transmission of UL channels or signals, and reception and transmission of SL channels or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a SL power control in FR2 in a wireless communication system.

The processor 340 can move data into or out of the memory 360 as required by an executing process. In some embodiments, the processor 340 is configured to execute the applications 362 based on the OS 361 or in response to signals received from gNBs, another UE, or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355 which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
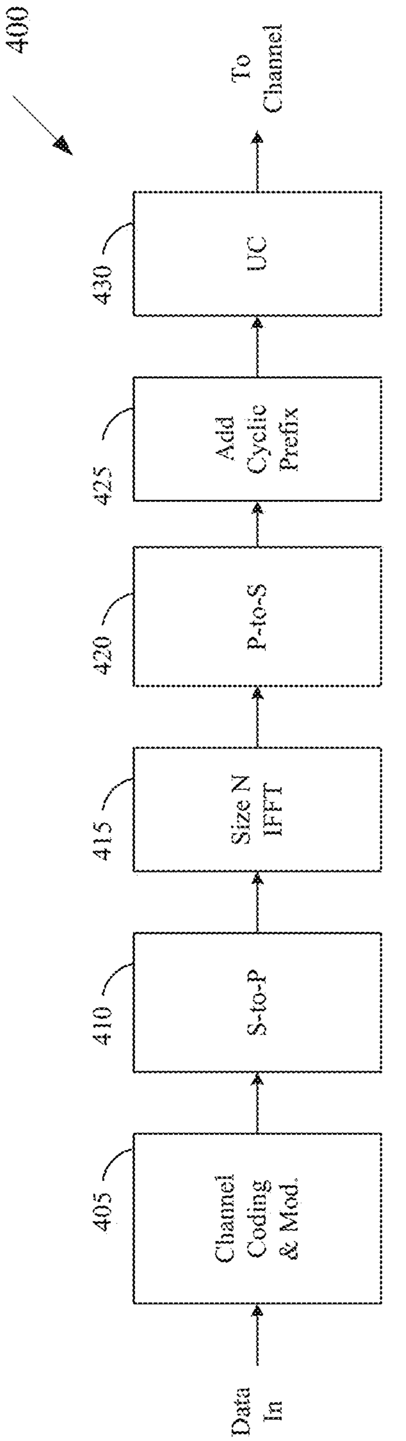
FIGS. 4 and 5 illustrate example of wireless transmit and receive paths according to the present disclosure.
Figure 5:
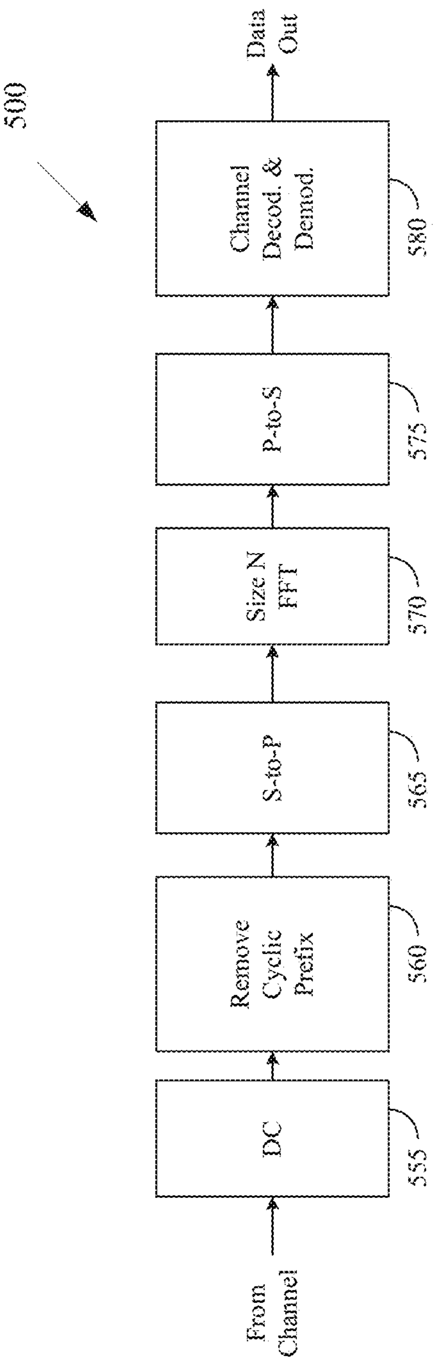

FIG. 4 and FIG. 5 illustrate example wireless transmit and receive paths according to this disclosure. In the following description, a transmit path 400 may be described as being implemented in a first UE (such as the UE 111), while a receive path 500 may be described as being implemented in a second UE (such as a UE 111A). However, it may be understood that the receive path 500 can be implemented in the second UE 111A and that the transmit path 400 can be implemented in the first UE 111. In some embodiments, the transmit path 400 and the receive path 500 are configured to support SL positioning power control in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 or another UE arrives at the UE 116 after passing through the wireless channel, and reverse operations to those at the gNB 102 or another UE are performed at the UE 116.

As illustrated in FIG. 5, the down converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 or transmitting in the sidelink to another UE and may implement the receive path 500 for receiving in the downlink from the gNBs 101-103 or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of the present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
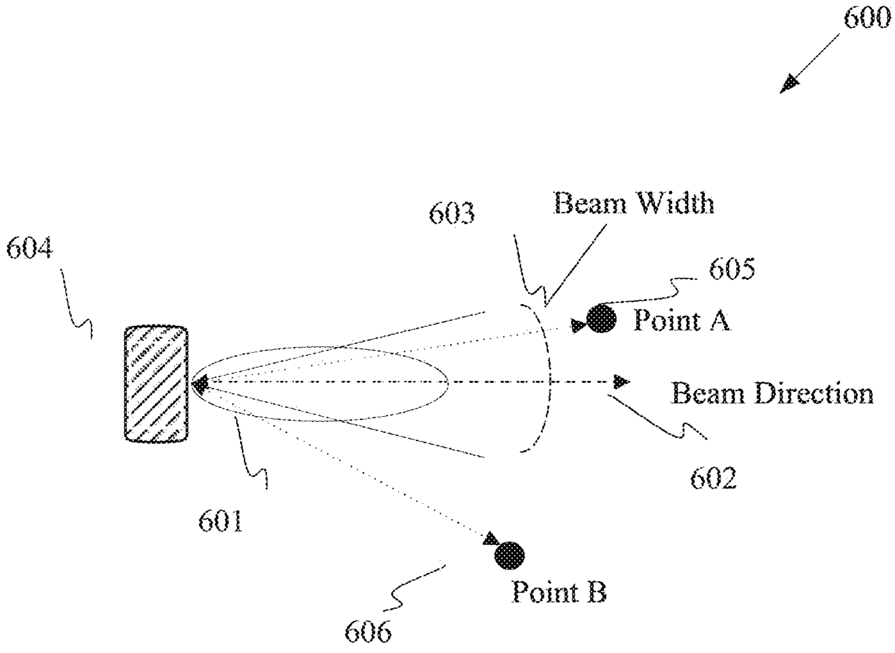
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
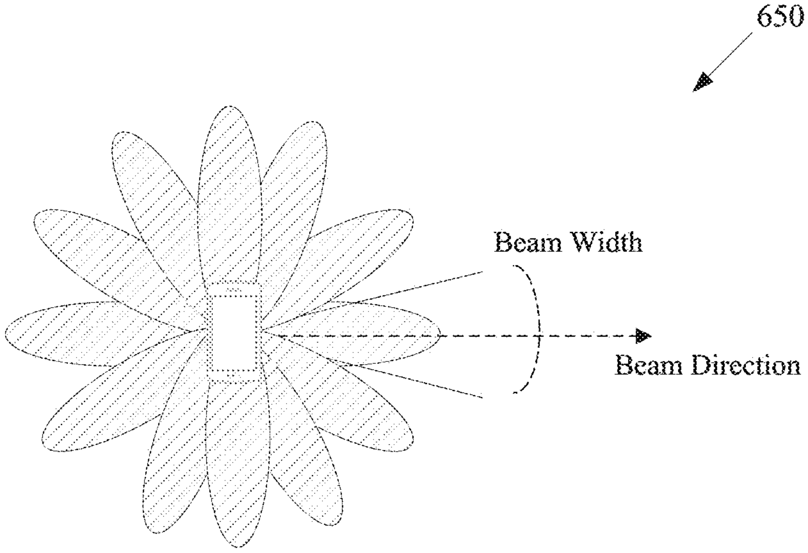
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
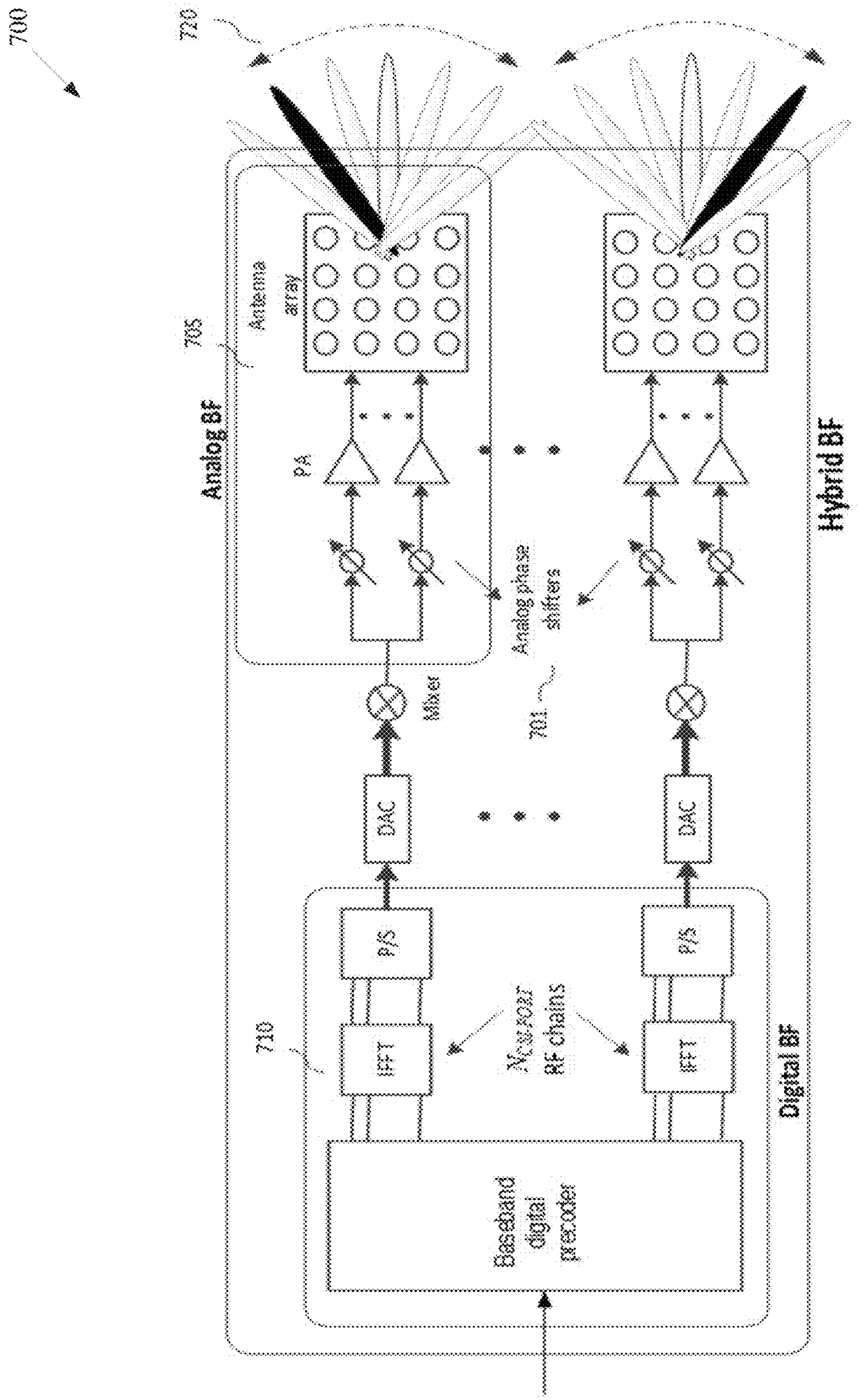
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI\text{-}PORT}$. A digital beamforming unit 710 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL or SL TX beam (also termed "beam indication"), measuring at least one reference signal for calculating and performing beam reporting (also termed "beam measurement" and "beam reporting," respectively), and receiving a DL or UL or SL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Figure 8:
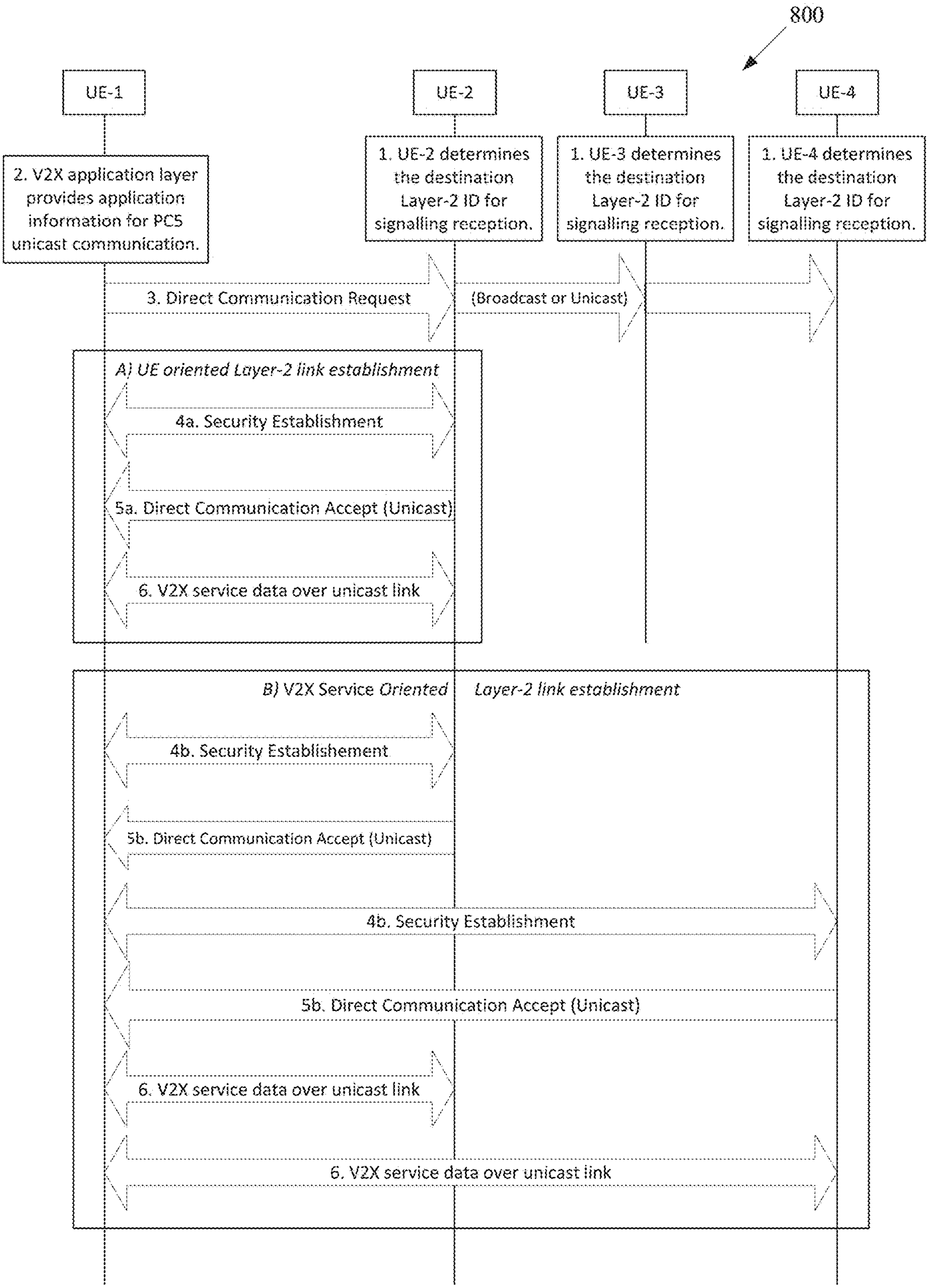
FIG. 8 illustrates a flowchart for an example of layer-2 link establishment procedure for unicast mode of V2X communication over PC5 reference point according to embodiments of the present disclosure.

FIG. 8 illustrates an example of layer-2 link establishment procedure 800 for unicast mode of V2X communication over PC5 reference point according to embodiments of the present disclosure. The layer-2 link establishment procedure 800 as may be performed by a UE (e.g., 111-116 as illustrated in FIG. 1). An embodiment of the layer-2 link establishment procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, following steps are performed.

In one example of Step 1, the UE(s) determine the destination Layer-2 ID for signaling reception of PC5 unicast link establishment. This is determined as specified in 3GPP standard specification TS 23.387. The destination Layer-2 ID is configured with the UE(s) as specified in 3GPP standard specification TS 23.387.

In one example of Step 2, the V2X application layer in UE-1 provides application information for PC5 unicast communicating.

In one example of Step 3, a UE-1 sends a direct communication request (DCR) to initiate the unicast layer-2 link establishment procedure. UE-1 send the DCR message via PC5 broadcast or unicast using the source layer-2 ID and destination layer-2 ID.

In one example of Step 4 (Step 4*a* or Step 4*b*), the target UE or the UEs that are interested in using the announced V2X service type(s) over a PC5 unicast link with UE-1 respond establishing the security with UE-1.

In one example of Step 5 (Step 5*a* or Step 5*b*), a direct communication accept message is sent to UE-1 by the target UE(s) that has successfully established security with UE-1.

In one example of Step 6, V2X service data is transmitted over the established unicast link.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems (see also REF 1). In addition, a slot can have symbols for SL communications. A UE can be configured one or more bandwidth parts (BWPs) of a system BW for transmissions or receptions of signals or channels.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, PSFCHs can also convey conflict information, and physical SL Broadcast channel (PSBCH) conveying system information to assist in SL synchronization.

SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, SL primary synchronization signals (S-PSS) and SL secondary synchronization signals (S-SSS) for SL synchronization, and SL position reference signal (SL PRS) for SL positioning measurements. SCI can include two parts/stages corresponding to two respective SCI formats where, for example, the first SCI format is multiplexed on a PSCCH, and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format (e.g., DCI Format 3_0) transmitted from the gNB on the DL. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a network can configure a UE one of two options for reporting of HARQ-ACK information by the UE: (1) HARQ-ACK reporting option 1: a UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB; and (2) HARQ-ACK reporting option 2: a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In a HARQ-ACK reporting option (1), when a UE that transmitted the PSSCH detects a NACK in a PSFCH reception, the UE can transmit another PSSCH with the TB (retransmission of the TB). In HARQ-ACK reporting option (2) when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by $$\{t_0'^{SL}, t_1'^{SL}, t_2'^{SL}, \ldots, t_{T'_{MAX}-1}'^{SL}\}$$

and can be configured, for example, at least using a bitmap. Where, $T'_{MAX}$ is the number of SL slots in a resource pool within 1024 frames. Within each slot $$t'^{SL}_{y}$$

of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB}=n_{subCHstart}+m\cdot n_{subCHsize}+j$, where j=0, 1, . . . , $n_{subCHsize}-1$, $n_{subCHstart}$ and $n_{subCHsize}$ are provided by higher layer parameters.

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels x+i, where i=0, 1, . . . , $L_{subCH}-1$ in slot $$t'^{SL}_{y}.$$

$T_1$ is determined by the UE such that, $$0 \le T_1 \le T^{SL}_{proc,1},$$

where $$T^{SL}_{proc,1}$$

is a PSSCH processing time for example as defined in TS 38.214. $T_2$ is determined by the UE such that $T_{2min} \le T_2 \le$ Remaining Packet Delay Budget, as long as $T_{2min} <$ Remaining Packet Delay Budget, else $T_2$ is equal to the Remaining Packet Delay Budget. $T_{2min}$ is a configured by higher layers and depends on the priority of the SL transmission.

The slots of a SL resource pool are determined as follows in TABLE 1.

TABLE 1

| SL resource pool determination |
|---|

1. Let set of slots that may belong to a resource be denoted by $\{t_0^{SL}, t_1^{SL}, t_2^{SL}, \ldots, t_{T_{MAX}-1}^{SL}\}$, where $0 \le t_i^{SL} < 10240 \times 2^{\mu}$, and $0 \le i < T_{max}$. μ is the sub-carrier spacing configuration. μ = 0 for a 15 kHz sub-carrier spacing. μ = 1 for a 30 kHz sub-carrier spacing. μ = 2 for a 60 kHz sub-carrier spacing. μ = 3 for a 120 kHz sub-carrier spacing. The slot index is relative to slot#0 of system frame number (SFN)#0 of the serving cell, or direct frame number (DFN)#0. The set of slots includes all slots except:
   a. $N_{S-SSB}$ slots that are configured for SL SS/PBCH Block (S-SSB).
   b. $N_{nonSL}$ slots where at least one SL symbol is not semi-statically configured as UL symbol by higher layer parameter tdd-UL-DL-ConfigurationCommon or sl-TDD-Configuration. In a SL slot, OFDM symbols Y-th, (Y + 1)-th, . . . , (Y + X − 1)-th are SL symbols, where Y is determined by the higher layer parameter sl-StartSymbol and X is determined by higher layer parameter sl-LengthSymbols.
   c. $N_{reserved}$ reserved slots. Reserved slots are determined such that the slots in the set $\{t_0^{SL}, t_1^{SL}, t_2^{SL}, \ldots, t_{T_{MAX}-1}^{SL}\}$ is a multiple of the bitmap length ($L_{bitmap}$), where the bitmap $(b_0, b_1, \ldots, b_{L_{bitmap}-1})$ is configured by higher layers. The reserved slots are determined as follows:
      i. Let $\{l_0, l_1, \ldots, l_{2^{\mu}\times 10240-N_{S-SSB}-N_{nonSL}-1}\}$ be the set of slots in range $0 \ldots 2^{\mu} \times 10240 - 1$, excluding S-SSB slots and non-SL slots. The slots are arranged in ascending order of the slot index.
      ii. The number of reserved slots is given by: $N_{reserved} = (2^{\mu} \times 10240 - 1$ $N_{S-SSB} - N_{nonSL}) \bmod L_{bitmap}$.
      iii. The reserved slots $l_r$ are given by: $r = \left\lfloor \frac{m\cdot(2^{\mu}\times 10240 - N_{S-SSB} - N_{nonSL})}{N_{reserved}} \right\rfloor$, where $m = 0, 1, \ldots, N_{reserved} - 1$ $T_{max}$ is given by: $T_{max} = 2^{\mu} \times 10240 - N_{S-SSB} - N_{nonSL} - N_{reserved}$.
2. The slots are arranged in ascending order of slot index.
3. The set of slots belonging to the SL resource pool, $\{t'^{SL}_0, t'^{SL}_1, t'^{SL}_2, \ldots, t'^{SL}_{T'_{MAX}-1}\}$, are determined as follows:
   a. Each resource pool has a corresponding bitmap $(b_0, b_1, \ldots, b_{L_{bitmap}-1})$ of length $L_{bitmap}$.
   b. A slot $t_k^{SL}$ belongs to the SL resource pool if $b_{k \bmod L_{bitmap}} = 1$
   c. The remaining slots are indexed successively staring from 0, 1, . . . $T'_{MAX} - 1$. Where, $T'_{MAX}$ is the number of remaining slots in the set.

Slots can be numbered (indexed) as physical slots or logical slots, wherein physical slots include all slots numbered sequential, while logical slots include only slots that are allocated to sidelink resource pool as described above numbered sequentially. The conversion from a physical duration, $P_{rsvp}$, in milli-second to logical slots, $$P'_{rsvp},$$

is given by $$P'_{rsvp} = \left\lceil \frac{T'_{max}}{10240\text{ ms}} \times P_{rsvp} \right\rceil$$

(see 3GPP standard specification TS 38.214).

For resource (re-)selection or re-evaluation in slot n, a UE can determine a set of available single-slot resources for transmission within a resource selection window [n+$T_1$, n+$T_2$], such that a single-slot resource for transmission, $R_{x,y}$ is defined as a set of $L_{subCH}$ contiguous subchannels x+i, where i=0, 1, . . . , $L_{subCH}-1$ in slot $$t_y^{SL}.$$

$T_1$ is determined by the UE such that, $$0 \le T_1 \le T_{proc,1}^{SL},$$

where $$T_{proc,1}^{SL}$$

is a PSSCH processing time for example as defined in 3GPP standard specification, 3GPP standard specification TS 38.214. $T_2$ is determined by the UE such that $T_{2min} \le T_2 \le$Remaining Packet Delay Budget, as long as $T_{2min}<$Remaining Packet Delay Budget, else $T_2$ is equal to the Remaining Packet Delay Budget. $T_{2min}$ is configured by higher layers and depends on the priority of the SL transmission.

The resource (re-)selection is a two-step procedure as shown in TABLE 2.

TABLE 2

| Resource selection procedures |
|---|
| - The first step (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE does not transmit SL. The resources excluded are based on reserved transmissions or semi-persistent transmissions that can collide with the excluded resources or any of reserved or semi-persistent transmissions. The identified candidate resources after resource exclusion are provided to higher layers. |
| - The second step (e.g., performed in the higher layers) is to select or re-select a resource from the identified candidate resources for PSSCH/PSCCH transmission. |

During the first step of the resource (re-)selection procedure, a UE can monitor slots in a sensing window $$[n - T_0, n - T_{proc,0}^{SL}),$$

where the UE monitors slots belonging to a corresponding sidelink resource pool that are not used for the UE's own transmission. For example, $$T_{proc,0}^{SL}$$

is the sensing processing latency time, for example as defined in 3GPP standard specification TS 38.214. To determine a candidate single-slot resource set to report to higher layers, a UE excludes (e.g., resource exclusion) from the set of available single-slot resources for SL transmission within a resource pool and within a resource selection window, the following, as shown in TABLE 3.

TABLE 3

| Resource selection procedures |
| --- |
| 1. Single slot resource $R_{xy}$, such that for any slot $t'_m{}^{SL}$ not monitored within the sensing window with a hypothetical received SCI Format 1-0, with a "Resource reservation period" set to any periodicity value allowed by a higher layer parameter reseverationPeriodAllowed, and indicating all sub-channels of the resource pool in this slot, satisfies condition 2.2. below. |
| 2. Single slot resource $R_{x,y}$, such that for any received SCI within the sensing window: |
| 1. The associated L1-RSRP measurement is above a (pre-)configured SL-RSRP threshold, where the SL-RSRP threshold depends on the priority indicated in the received SCI and that of the SL transmission for which resources are being selected. |
| 2. (Condition 2.2) The received SCI in slot $t'_m{}^{SL}$, or if "Resource reservation field" is present in the received SCI the same SCI is assumed to be received in slot $t'_{m+q\times P_{rsvp+Rx}'}{}^{SL}$, indicates a set of resource blocks that overlaps $R_{x,y+j\times P_{rsvp\_Tx}'}$. Where, |
| $q = 1, 2, \ldots, Q$, where, |
| If $P_{rsvp\_RX} \le T_{scal}$ and $n' - m < P'_{rsvp\_Rx} \rightarrow Q = \left\lceil \frac{T_{scal}}{P_{rsvp\_RX}} \right\rceil \cdot T_{scal}$ |
| is $T_2$ in units of milli-seconds. |
| Else Q = 1 |
| If n belongs to ($t'_0{}^{SL}, t'_1{}^{SL}, \ldots, t'_{T_{max}-1}{}^{SL}$), n' = n, else n' is the first slot after slot n belonging to set ($t'_0{}^{SL}, t'_1{}^{SL}, \ldots, t'_{T_{max}-1}{}^{SL}$). |
| $j = 0, 1, \ldots, C_{resel} - 1$ |
| $P_{rsvp\_RX}$ is the indicated resource reservation period in the received SCI in physical slots, and $P'_{rsvp\_RX}$ is that value converted to logical slots. |
| $P'_{rsvp\_Tx}$ is the resource reservation period of the SL transmissions for which resources are being reserved in logical slots. |
| 3. If the candidate resources are less than a (pre-)configured percentage given by higher layer parameter sl_TxPrecentageList($prio_{TX}$) that depends on the priority of the SL transmission $prio_{TX}$, such as 20%, of the total available resources within the resource selection window, the (pre-)configured SL-RSRP thresholds are increased by a predetermined amount, such as 3 dB. |

NR sidelink introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot $m-T_3$.

The re-evaluation check includes: (1) performing the first step of the SL resource selection procedure as defined in the 3GPP specifications TS 38.214, which involves identifying a candidate (available) sidelink resource set in a resource selection window as previously described; (2) if the pre-selected resource is available in the candidate sidelink resource set, the resource is used/signaled for sidelink transmission; and (3) else, the pre-selected resource is not available in the candidate sidelink resource set, a new sidelink resource is re-selected from the candidate sidelink resource set.

A pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot $m-T_3$.

When pre-emption check is enabled by higher layers, pre-emption check includes: (1) performing the first step of the SL resource selection procedure as defined in the 3GPP specifications TS 38.214, which involves identifying candidate (available) sidelink resource set in a resource selection window as previously described; (2) if the pre-selected and reserved resource is available in the candidate sidelink resource set, the resource is used/signaled for sidelink transmission; (3) else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource being checked for pre-emption be $P_{TX}$: (i) if the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority; and (ii) else, the resource is used/signaled for sidelink transmission.

In one example, a UE determines a power, $P_{S-SSB}(i)$, in dBm, for an S-SS/PSBCH block (S-SSB) transmission occasion in slot i on an active SL BWP b of a carrier f, as:

$$P_{S\text{-}SSB}(i) = \min\left(P_{CMAX}, P_{O,S\text{-}SSB} + 10\log_{10}\left(2^{\mu} \cdot M_{RB}^{S\text{-}SSB}\right) + \alpha_{S\text{-}SSB} \cdot PL\right)$$

where followings are determined as shown in TABLE 4.

TABLE 4

| Parameters for power control |
| --- |
| - $P_{CMAX}$ is the configured maximum output power of the UE [TS 38.101]. |
| - $P_{O,S\text{-}SSB}$ is the P0 value for DL pathloss based power control for PSBCH. If dl-P0-PSBCH-r17 is configured and supported by the UE it is used for $P_{O,S\text{-}SSB}$, else if dl-P0-PSBCH-r16 |

TABLE 4-continued

| Parameters for power control |
|---|
| is configured it is used for $P_{O,S\text{-}SSB}$, else DL pathloss based power control for PSBCH is disabled, i.e., $P_{S\text{-}SSB}(i) = P_{CMAX}$.<br>○ dl-P0-PSBCH-r16 has a range of −16 ... 15<br>○ dl-P0-PSBCH-r17 has a range of −202 ... 24<br>- $\mu$ is the sub-carrier spacing configuration as previously described.<br>- $M_{RB}^{S\text{-}SSB}$ is the number of resource blocks for S-SS/PSBCH block transmission. $M_{RB}^{S\text{-}SSB}$ = 11.<br>- $\alpha_{S\text{-}SSB}$ is the alpha value for DL pathloss based power control for PSBCH. This is provided by higher layer parameter dl-Alpha-PSBCH-r16, and is 1 if that parameter is not configured. dl-Alpha-PSBCH-r16 is a value from the set {0, 0.4, 0.5,0.6,0.7,0.8,0.9,1}.<br>- PL is the pathloss, which is given by $PL = PL_{b,f,c}(q_d)$ when the active SL BWP is on serving cell c. The RS resource $q_d$ for determining the pathloss is given by:<br>○ When the UE is configured to monitor PDCCH for detection of DCI Format 0_0 in serving cell c: RS resource used for determining the power of a PUSCH transmission scheduled by DCI Format 0_0 in serving cell c.<br>○ When the UE is not configured to monitor PDCCH for detection of DCI Format 0_0 in serving cell c: RS resource corresponding to SS/PBCH block used by the UE to obtain the MIB. |

In one example, a UE determines a power, $P_{PSSCH}(i)$, in dBm, for a PSSCH transmission occasion i of a resource pool, on an active SL BWP b of a carrier f, and in symbols where PSCCH is not transmitted as: $P_{PSSCH}(i)$=min ($P_{CMAX}$, $P_{MAX,CBR}$,min ($P_{PSSCH,D}(i)$, $P_{PSSCH,SL}(i)$)) where followings are determined as shown in TABLE 5.

TABLE 5

| Parameters for power control |
|---|
| - $P_{CMAX}$ is the configured maximum output power of the UE (e.g., 3GPP standard specification TS 38.101).<br>- $P_{MAX,CBR}$ is determined based on the priority level and the CBR range for a CBR measured in slot i − N. Where, N is the congestion control processing time (e.g., 3GPP standard specification TS 38.214).<br>- $P_{PSSCH,D}(i)$ is the component for DL pathloss based power control for PSSCH. Which is given by:<br>○ If dl-P0-PSSCH-PSCCH is provided: $P_{PSSCH,D}(i) = P_{O,D} + 10\log_{10}(2^{\mu} \cdot M_{RB}^{PSSCH}(i)) + \alpha_D \cdot PL_D$<br>○ If dl-P0-PSSCH-PSCCH is not provided: $P_{PSSCH,D}(i) = \min(P_{CMAX}, P_{MAX,CBR})$<br>○ $P_{O,D}$ is the P0 value for DL pathloss based power control for PSSCH/PSCCH. If dl-P0-PSSCH-PSCCH-r17 is configured and supported by the UE it is used for $P_{O,D}$, else if dl-P0-PSSCH-PSCCH-r16 is configured it is used for $P_{O,D}$, else DL pathloss based power control for PSSCH/PSCCH is disabled.<br>■ dl-P0-PSSCH-PSCCH-r16 has a range of −16 ... 15<br>■ dl-P0- PSSCH-PSCCH -r17 has a range of −202 ... 24<br>○ $\mu$ is the sub-carrier spacing configuration as previously described.<br>○ $M_{RB}^{PSSCH}(i)$ is the number of resource blocks for PSSCH transmission occasion i.<br>○ $\alpha_D$ is the alpha value for DL pathloss based power control for PSSCH/PSCCH. This is provided by higher layer parameter dl-Alpha-PSSCH-PSCCH-r16, and is 1 if that parameter is not configured. dl-Alpha-PSSCH-PSCCH-r16 is a value from the set {0, 0.4, 0.5,0.6,0.7,0.8,0.9,1}.<br>○ $PL_D$ is the DL pathloss, which is given by $PL_D = PL_{b,f,c}(q_d)$ when the active SL BWP is on serving cell c. The RS resource $q_d$ for determining the pathloss is given by:<br>■ When the UE is configured to monitor PDCCH for detection of DCI Format 0_0 in serving cell c: RS resource used for determining the power of a PUSCH transmission scheduled by DCI Format 0_0 in serving cell c.<br>■ When the UE is not configured to monitor PDCCH for detection of DCI Format 0_0 in serving cell c: RS resource corresponding to SS/PBCH block used by the UE to obtain the MIB.<br>- $P_{PSSCH,SL}(i)$ is the component for SL pathloss based power control for PSSCH. Which is given by:<br>○ If sl-P0-PSSCH-PSCCH is provided: $P_{PSSCH,SL}(i) = P_{O,SL} + 10\log_{10}(2^{\mu} \cdot M_{RB}^{PSSCH}(i)) + \alpha_{SL} \cdot PL_{SL}$<br>○ If sl-P0-PSSCH-PSCCH is not provided: $P_{PSSCH,SL}(i) = \min(P_{CMAX}, P_{PSSCH,D}(i)$<br>○ $P_{O,SL}$ is the P0 value for SL pathloss based power control for PSSCH/PSCCH. If sl-P0-PSSCH-PSCCH-r17 is configured and supported by the UE it is used for $P_{O,SL}$, else if sl-P0-PBSCH-r16 is configured it is used for $P_{O,SL}$, else SL pathloss based power control for PSSCH/PSCCH is disabled.<br>■ sl-P0-PSSCH-PSCCH-r16 has a range of −16 ... 15<br>■ sl-P0- PSSCH-PSCCH -r17 has a range of −202 ... 24<br>○ $\mu$ is the sub-carrier spacing configuration as previously described.<br>○ $M_{RB}^{PSSCH}(i)$ is the number of resource blocks for PSSCH transmission occasion i.<br>○ $\alpha_{SL}$ is the alpha value for SL pathloss based power control for PSSCH/PSCCH. This is provided by higher layer parameter sl-Alpha-PSSCH-PSCCH-r16, and is 1 if that parameter is not configured. sl-Alpha-PSSCH-PSCCH-r16 is a value from the set {0, 0.4, 0.5,0.6,0.7,0.8,0.9,1}. |

TABLE 5-continued

| Parameters for power control |
| --- |
| ○ $PL_{SL}$ is the SL pathloss, which is given by $PL_{SL}$ = referenceSignalPower − higher layer filtered RSRP:<br>■ referenceSignalPower is obtained by summing the PSSCH transmit power per RE over all antenna ports and higher layer filtered across PSSCH transmission occasions using filter configuration provided by sl-FilterCoefficient.<br>■ "higher layer filtered RSRP" is the SL RSRP measured by the UE receiving the PSSCH/PSCCH transmissions and reported to the UE that transmitted PSSCH/PSCCH. The SL RSRP is measured on PSSCH DMRS and filtered across PSSCH transmission occasions using filter configuration provided by sl-FilterCoefficient. |

The UE splits its power equally among antenna ports that have non-zero power.

In one example, in symbols where PSSCH and PSCCH are transmitted, a UE determines a power, $P_{PSSCH2}(i)$, in dBm, for a PSSCH transmission occasion i of a resource pool, on an active SL BWP b of a carrier f, and in symbols where PSSCH and PSCCH are transmitted as:

$$P_{PSSCH2}(i) = 10\log_{10}\left(\frac{M_{RB}^{PSSCH}(i) - M_{RB}^{PSCCH}(i)}{M_{RB}^{PSSCH}(i)}\right) + P_{PSSCH}(i)$$

wherein parameters are determined as shown in TABLE 6.

TABLE 6

| Parameters for power control |
| --- |
| - $M_{RB}^{PSSCH}(i)$ is the number of resource blocks for PSSCH transmission occasion i. |
| - $M_{RB}^{PSSCH}(i)$ is the number of resource blocks for PSCCH transmission occasion i. |
| - $P_{PSSCH}(i)$ is the PSSCH power in symbols with no PSCCH. |

In one example, a UE determines a power, $P_{PSCCH}(i)$, in dBm, for a PSCCH transmission occasion i of a resource pool, on an active SL BWP b of a carrier f, as:

$$P_{PSCCH}(i) = 10\log_{10}\left(\frac{M_{RB}^{PSCCH}(i)}{M_{RB}^{PSSCH}(i)}\right) + P_{PSSCH}(i)$$

where parameters are determined as shown in TABLE 7.

TABLE 7

| Parameters for power control |
| --- |
| - $M_{RB}^{PSSCH}(i)$ is the number of resource blocks for PSSCH transmission occasion i. |
| - $M_{RB}^{PSSCH}(i)$ is the number of resource blocks for PSCCH transmission occasion i. |
| - $P_{PSSCH}(i)$ is the PSSCH power in symbols with no PSCCH. |

In one example, a UE has $N_{sch,TX,PSFCH}$ scheduled with PSFCH transmissions for HARQ-ACK information and conflict information. The UE is capable of transmitting a maximum of $N_{max,PSFCH}$. The UE determines $N_{TX,PSFCH}$ PSFCH to transmit, each with a power $P_{PSFCH,k}(i)$, for $1 \le k \le N_{TX,PSFCH}$, for a PSFCH transmission occasion i of a resource pool, on an active SL BWP b of a carrier f. A UE can be provided with higher layer parameter dl-P0-PSFCH for P0 for DL pathloss based power control for PSFCH. The UE calculates $P_{PSFCH,one}$ in dBm: $P_{PSFCH,one} = P_{O,PSFCH} + 10\log_{10}(2^{\mu}) + \alpha_{PSFCH} \cdot PL$ where parameters are determined as shown in TABLE 8.

TABLE 8

| Parameters for power control |
| --- |
| - $P_{O,PSFCH}$ is the P0 value for DL pathloss based power control for PSFCH. If dl-P0-PSFCH-r17 is configured and supported by the UE it is used for $P_{O,PSFCH}$, else if dl-P0-PSFCH-r16 |

TABLE 8-continued

| Parameters for power control |
| --- |
| is configured it is used for $P_{O,PSFCH}$, else DL pathloss based power control for PSFCH is disabled, i.e., $P_{PSFCH,k}(i) = P_{CMAX} - 10\log_{10}(N_{TX,PSFCH})$, where $P_{CMAX}$ is determined for $N_{TX,PSFCH}$ transmissions.<br>○ dl-P0-PSFCH-r16 has a range of −16 ... 15<br>○ dl-P0-PSFCH-r17 has a range of −202 ... 24<br>- μ is the sub-carrier spacing configuration as previously described.<br>- $\alpha_{PSFCH}$ is the alpha value for DL pathloss based power control for PSFCH. This is provided by higher layer parameter dl-Alpha-PSFCH-r16, and is 1 if that parameter is not configured. dl-Alpha-PSFCH-r16 is a value from the set {0, 0.4, 0.5,0.6,0.7,0.8,0.9,1}.<br>- PL is the pathloss, which is given by $PL = PL_{b,f,c}(q_d)$ when the active SL BWP is on serving cell c. The RS resource $q_d$ for determining the pathloss is given by:<br>○ When the UE is configured to monitor PDCCH for detection of DCI Format 0_0 in serving cell c: RS resource used for determining the power of a PUSCH transmission scheduled by DCI Format 0_0 in serving cell c.<br>○ When the UE is not configured to monitor PDCCH for detection of DCI Format 0_0 in serving cell c: RS resource corresponding to SS/PBCH block used by the UE to obtain the MIB. |

If the number of scheduled PSFCH transmissions (i.e., $N_{sch,TX,PSFCH}$) is less than or equal to the number of maximum number of PSFCH transmission the UE is capable to transmit (i.e., $N_{max,PSFCH}$): $N_{sch,TX,PSFCH} \leq N_{max,PSFCH}$, and: (1) if the power to transmit the $N_{sch,TX,PSFCH}$ scheduled PSFCH transmissions does not exceed the maximum configured output power $P_{CMAX}$ determined for $N_{sch,TX,PSFCH}$ PSFCH transmissions, i.e., $P_{PSFCH,one}+10\log_{10}(N_{sch,TX,PSFCH}) \leq P_{CMAX}$, therefore: $N_{TX,PSFCH}=N_{sch,TX,PSFCH}$ and $P_{PSFCH,k}(i)=P_{PSFCH,one}$; and (2) if the power to transmit the $N_{sch,TX,PSFCH}$ scheduled PSFCH transmissions exceeds the maximum configured output power $P_{CMAX}$, i.e., $P_{PSFCH,one}+10\log_{10}(N_{sch,TX,PSFCH}) > P_{CMAX}$, the UE determines $N_{TX,PSFCH}$ PSFCH transmissions, first with ascending order of priority field for PSFCH transmissions that carry HARQ-ACK information, then with ascending order of priority field for PSFCH transmissions that carry conflict information, such that $$N_{TX,PSFCH} \geq \max\left(1, \textstyle\sum_{i=1}^{K} M_i\right).$$

Where, for 1≤i≤8, $M_i$ is the number of PSFCH transmissions carrying HARQ-ACK information with priority level i, and for i>8, $M_i$ is the number of PSFCH transmissions carrying conflict information with priority level i-8. K is the largest value satisfying $$P_{PSFCH,one} + 10\log_{10}\left(\max\left(1, \textstyle\sum_{i=1}^{K} M_i\right)\right) \leq P_{CMAX},$$

if any, otherwise K=0. The PSFCH power is given by: $P_{PSFCH,k}(i)=\min(P_{CMAX}-10\log_{10}(N_{TX,PSFCH}), P_{PSFCH,one})$, where $P_{CMAX}$ is determined for $N_{TX,PSFCH}$ transmissions.

If the number of scheduled PSFCH transmissions (i.e., $N_{sch,TX,PSFCH}$) exceeds the number of maximum number of PSFCH transmission the UE is capable to transmit (i.e., $N_{max,PSFCH}$): $N_{sch,TX,PSFCH} > N_{max,PSFCH}$, the UE selects $N_{max,PSFCH}$ PSFCH transmission based on the priority of the PSFCH transmissions as described later: (1) if the power to transmit the $N_{max,PSFCH}$ PSFCH transmissions does not exceed the maximum configured output power $P_{CMAX}$ determined for $N_{max,PSFCH}$ PSFCH transmissions, i.e., $P_{PSFCH,one}+10\log_{10}(N_{max,PSFCH}) \leq P_{CMAX}$, therefore: $N_{TX,PSFCH}=N_{max,PSFCH}$ and $P_{PSFCH,k}(i)=P_{PSFCH,one}$; and (2) if the power to transmit the $N_{max,PSFCH}$ PSFCH transmissions exceeds the maximum configured output power $P_{CMAX}$, i.e., $P_{PSFCH,one}+10\log_{10}(N_{max,PSFCH}) > P_{CMAX}$, the UE determines $N_{TX,PSFCH}$ PSFCH transmissions, first with ascending order of priority field for PSFCH transmissions that carry HARQ-ACK information, then with ascending order of priority field for PSFCH transmissions that carry conflict information, such that $$N_{TX,PSFCH} \geq \max\left(1, \textstyle\sum_{i=1}^{K} M_i\right).$$

Where, for 1≤i≤8, $M_i$ is the number of PSFCH transmissions carrying HARQ-ACK information with priority level i, and for i>8, $M_i$ is the number of PSFCH transmissions carrying conflict information with priority level i−8. K is the largest value satisfying $$P_{PSFCH,one} + 10\log_{10}\left(\max\left(1, \textstyle\sum_{i=1}^{K} M_i\right)\right) \leq P_{CMAX},$$

if any, otherwise K=0. The PSFCH power is given by: $P_{PSFCH,k}(i)=\min(P_{CMAX}-10\log_{10}(N_{TX,PSFCH}), P_{PSFCH,one})$, where $P_{CMAX}$ is determined for $N_{TX,PSFCH}$ transmissions.

The priority of PSFCH transmissions and receptions are determined as follows: (1) for a PSFCH transmission or reception with HARQ-ACK information, a priority value for the PSFCH is equal to the priority value indicated by SCI format 1-A associated with the PSFCH; (2) for a PSFCH transmission with conflict information, a priority value for the PSFCH is equal to the smallest priority value determined by the corresponding SCI format(s) 1-A for the conflicting resource(s); and (3) for a PSFCH reception with conflict information, a priority value for the PSFCH is equal to the priority value determined by corresponding SCI format 1-A for the conflicting resource.

In one example, for PSFCH transmissions in a slot, the PSFCH transmissions have a priority value equal to the smallest priority value of PSFCH transmissions with HARQ-ACK information and PSFCH transmissions with conflict information in the slot.

In one example, for PSFCH receptions in a slot, the PSFCH receptions have a priority value equal to the smallest priority value of PSFCH receptions with HARQ-ACK information and PSFCH receptions with conflict information in the slot.

In one example, if (1) a UE may transmit a first channel or signal using the E-UTRA radio access, and transmit second channels and/or signals using NR radio access, (2) a transmission of the first channel or signal overlaps in time with a transmission of the second channels and/or signals, and (3) the priories of the channels and signals are known to the UE at least T msec before the earliest transmission, where T≤4 up to the UEs implementation; the UE transmits the channels or signals of the radio access technology with the highest priority. The priority is determined based on (1) the SCI formats scheduling the transmissions, (2) as indicated by higher layers for S-SSB (provided by higher layer parameter sl-SSB-Priority NR) and E-UTRA SL synchronization signal, (3) for PSFCH as described earlier.

In one example, if (1) a UE may transmit or received a first channel or signal using the E-UTRA radio access, and receive a second channel or signal or transmit second channels and/or signals using NR radio access, (2) a transmission or reception of the first channel or signal overlaps in time with a reception of the second channel or signal or a transmission of the second channels and/or signals, and (3) the priories of the channels and signals are known to the UE at least T msec before the earliest transmission, where T≤4 up to the UEs implementation; the UE transmits or receives the channels or signals of the radio access technology with the highest priority. The priority is determined based on (1) the SCI formats scheduling the transmissions, (2) as indicated by higher layers for S-SSB (provided by higher layer parameter sl-SSB-Priority NR) and E-UTRA SL synchronization signal, (3) for PSFCH as described earlier.

In one example, if (1) a UE may transmit $N_{sch,TX,PSFCH}$ PSFCHs and receive $N_{sch,RX,PSFCH}$ PSFCHs, and (2) the transmissions of the $N_{sch,TX,PSFCH}$ PSFCHs overlap in time with the receptions of the $N_{sch,RX,PSFCH}$ PSFCHs, the UE transmits or receives only a set of PSFCHs corresponding to the smallest priority field value (highest priority) as follows: (1) first determined by PSFCHs with HARQ-ACK information; and (2) if no PSFCHs have HARQ-ACK information, then determined by PSFCHs with conflict information.

In one example, if a UE may transmit $N_{sch,TX,PSFCH}$ PSFCHs in a PSFCH transmission occasion and the UE transmits $N_{TX,PSFCH}$ PSFCHs in the transmission occasion: (1) the UE first transmits PSFCHs with HARQ-ACK information from $N_{TX,PSFCH}$ PSFCHs with the smallest priority field values (highest priority); and (2) subsequently the UE transmits the remaining PSFCHs with conflict information from $N_{TX,PSFCH}$ PSFCHs with the smallest priority field values (highest priority).

In one example, if a UE indicates a capability to receive $N_{RX,PSFCH}$ PSFCHs in a PSFCH reception occasion: (1) the UE first receives PSFCHs with HARQ-ACK information in ascending order of priority value (descending order of priority); and (2) subsequently the UE receive PSFCHs with conflict information in ascending order of priority value (descending order of priority).

In one example, if (1) a UE may simultaneously transmit on UL and on SL in a carrier or in two respective carriers, and (2) the UE is not capable of simultaneous transmissions on UL and on SL in a carrier or in two respective carriers; the UE only transmits on the link (UL or SL) with the higher priority.

In one example, if (1) a UE may simultaneously transmit on UL and receive on SL in a carrier, or (2) the UE may simultaneously transmit on UL and receive on SL in two respective carriers and the UE is not capable of simultaneous transmissions on UL and reception on SL in two respective carriers; the UE only transmits on UL or receives on SL with the higher priority.

In one example, if (1) a UE is capable of simultaneous transmission on UL and SL in two respective carriers, (2) may transmit on UL and on SL in two respective carriers, (3) the transmissions on UL and SL may over in a time period, and (4) the total UE transmit power exceeds $P_{CMAX}$ over the time period: (1) if the SL transmission has a higher priority than the UL transmission: the UE reduces the power of the UL transmission power prior to the start of the UL transmission such that the total UE transmission power over the time period does not exceed $P_{CMAX}$; and (2) if the UL transmission has a higher priority than the SL transmission: the UE reduces the power of the SL transmission power prior to the start of the SL transmission such that the total UE transmission power over the time period does not exceed $P_{CMAX}$.

One type of UL transmission can include, denote this as UL transmission TypeX: (1) a PRACH transmission; (2) a PUSCH scheduled by an UL grant in a RAR or its retransmission; (3) a PUSCH for Type-2 random access procedure and its retransmission; (4) a PUCCH with HARQ-ACK information in response to a success RAR; and (5) a PUCCH indicated by a DCI format 1_0 with CRC scrambled by a TC-RNTI.

In one example, if an UL transmission of TypeX, as previously described, overlaps with a SL transmission, the UL transmission has a higher priority.

In one example, if an UL transmission other than that of TypeX, as previously described, overlaps with a SL transmission, the priority of UL and SL transmissions are determined as follows in TABLE 9.

TABLE 9

| Determination of priority of UL and SL transmissions |
|---|
| - If the UL transmission is a PUSCH or a PUCCH with priority index 1:<br>○ If the priority value of the SL transmission or reception is smaller than sl-PriorityThreshold-UL-URLLC, the SL transmission has a higher priority,<br>○ If the priority value of the SL transmission or reception is not smaller than sl-PriorityThreshold-UL-URLLC, the UL transmission has a higher priority,<br>○ If higher layer parameter is not provided (configured), the UL transmission has a higher priority,<br>- Otherwise (UL transmission does not have priority index 1:<br>○ If the priority value of the SL transmission or reception is smaller than sl-PriorityThreshold, the SL transmission has a higher priority,<br>○ If the priority value of the SL transmission or reception is not smaller than sl-PriorityThreshold, the UL transmission has a higher priority. |

In one example, a PUCCH transmission with SL HARQ-ACK information has a higher priority than a SL transmission, if the priority value of the PUCCH is smaller than the priority value of the SL transmission. A SL transmission has a higher priority than a PUCCH transmission with SL HARQ-ACK information, if the priority value of the PUCCH is larger than the priority value of the SL transmission.

In one example, a PUCCH transmission with SL HARQ-ACK information has a higher priority than a PSFCH/S-SSB reception, if the priority value of the PUCCH is smaller than the priority value of the PSFCH/S-SSB reception. A PSFCH/S-SSB reception has a higher priority than a PUCCH transmission with SL HARQ-ACK information, if the priority value of the PUCCH is larger than the priority value of the PSFCH/S-SSB reception.

In one example, if one or more SL transmissions from a UE overlap with multiple non-overlapping UL transmissions from the UE, the UE performs SL transmission if at least one SL transmission is prioritized over all UL transmissions from the UE subject to the UE processing timeline with respect to the first SL transmission and the first UL transmission.

In one example, if one or more UL transmissions from a UE overlap with multiple non-overlapping SL transmissions from the UE, the UE performs UL transmission if at least one UL transmission is prioritized over all SL transmissions from the UE subject to the UE processing timeline with respect to the first SL transmission and the first UL transmission.

In one example, if one SL transmission from a UE overlap with one or more overlapping UL transmissions from the UE, the UE performs SL transmission if the SL transmission is prioritized over all UL transmissions from the UE subject to the UE multiplexing and processing timelines with respect to the first SL transmission and the first UL transmission.

In one example, if one SL transmission from a UE overlap with one or more overlapping UL transmissions from the UE, the UE performs UL transmission if at least one UL transmission from the UE is prioritized over the SL transmission subject to the UE multiplexing and processing timelines with respect to the first SL transmission and the first UL transmission.

As mentioned in the present disclosure, the monitoring procedure for resource (re)selection during the sensing window requires sensing which includes reception and decoding of a SCI format during the sensing window as well as measuring the SL RSRP. This reception and decoding process and measuring the SL RSRP increases a processing complexity and power consumption of a UE for sidelink communication and requires the UE to have receive circuitry on the SL for sensing even if the UE only transmits and does not receive on the sidelink. The aforementioned sensing procedure is referred to as full sensing.

Rel-17 introduced low-power resource allocation. Low-power resource allocation schemes include partial sensing and random resource selection. If a SL transmission from a UE is periodic, partial sensing can be based on periodic-based partial sensing (PBPS), and/or contiguous partial sensing (CPS). If a SL transmission from a UE is aperiodic, partial sensing can be based on CPS and PBPS if the resource pool supports periodic reservations (i.e., sl_multi-ReserveResource is enabled). When a UE performs PBPS, the UE selects a set of Y slots ($Y \geq Y_{min}$) within a resource selection window corresponding to PBPS, where $Y_{min}$ is provided by higher layer parameter minNumCandidateSlotsPeriodic . . . The UE monitors slots at $$t'^{SL}_{y-k \times P_{reserve}},$$

where $$t'^{SL}_{y}$$

is a slot of the Y selected candidate slots.

The periodicity value for sensing for PBPS, i.e., $P_{reserve}$ is a subset of the resource reservation periods allowed in a resource pool provided by higher layer parameter sl-ResourceReservePeriodList. $P_{reserve}$ is provided by higher layer parameter periodicSensingOccasionReservePeriodList, if not configured, $P_{reserve}$ includes all periodicities in sl-ResourceReservePeriodList. The UE monitors k sensing occasions determined by additionalPeriodicSensingOccasion, as previously described, and not earlier than $n-T_0$. For a given periodicity $P_{reserve}$, the values of k correspond to the most recent sensing occasion earlier than $$t'^{SL}_{y0} - \left(T^{SL}_{proc,0} + T^{SL}_{proc,1}\right)$$

if additionalPeriodicSensingOccasion is not (pre-)configured, and additionally includes the value of k corresponding to the last periodic sensing occasion prior to the most recent one if additionalPeriodicSensingOccasion is (pre-)configured.

$$t'^{SL}_{y0}$$

is the first slot of the selected Y candidate slots of PBPS. When a UE performs CPS, the UE selects a set of Y' slots ($Y' \geq Y'_{min}$) within a resource selection window corresponding to CPS, where $Y_{min}$ is provided by higher layer parameter minNumCandidateSlotsAperiodic. The sensing window for CPS starts at least M logical slots before $$t'^{SL}_{y0}$$

(the first of the Y' candidate slots) and ends at $$t'^{SL}_{y0} - \left(T^{SL}_{proc,0} + T^{SL}_{proc,1}\right).$$

Rel-17 introduced inter-UE co-ordination (IUC) to enhance the reliability and reduce the latency for resource allocation, where SL UEs exchange information with one another over sidelink to aid the resource allocation mode 2 (re-)selection procedure. A UE-A provides information to a UE-B, and a UE-B uses the provided information for its resource allocation mode 2 (re-)selection procedure. IUC is designed to address issues with distributed resource allocation such as: (1) Hidden node problem, where a UE-B is transmitting to a UE-A and a UE-B cannot sense or detect transmissions from a UE-C that interfere with its transmission to a UE-A, (2) Exposed node problem, where a UE-B is transmitting to a UE-A, and a UE-B senses or detects transmissions from a UE-C and avoids the resources used or reserved by a UE-C, but a UE-C does not cause interference at a UE-A, (3) Persistent collision problem, and (4) Half-duplex problem, where a UE-B is transmitting to a UE-A in the same slot that a UE-A is transmitting in. The UE-A may miss the transmission from a UE-B as the UE-A cannot receive and transmit in the same slot.

There are two schemes for inter-UE co-ordination, as described herein.

In one example, in scheme 1, a UE-A can provide to another UE-B indications of resources that are preferred to be included in a UE-B's (re-)selected resources or non-preferred resources to be excluded for a UE-B's (re-)selected resources. When given preferred resources, a UE-B may use only those resources for its resource (re-)selection, or it may combine them with resources identified by its own sensing procedure, by finding the intersection of the two sets of resources, for its resource (re-) selection. When given non-preferred resources, a UE-B may exclude these resources from resources identified by its own sensing procedure for its resource (re-)selection. Transmissions of co-ordination information (e.g., IUC messages) sent by a UE-A to a UE-B, and co-ordination information requests for (e.g., IUC requests) sent by a UE-B to a UE-A, are sent in a MAC-CE message and may also, if the supported by the UE, be sent in a $2^{nd}$-stage SCI Format (SCI Format 2-C).

The benefit of using the 2nd stage SCI is to reduce latency. IUC messages from a UE-A to a UE-B can be sent standalone or can be combined with other SL data. Coordination information (IUC messages) can be in response to a request from a UE-B, or due to a condition at a UE-A. An IUC request is unicast from a UE-B to a UE-A, in response a UE-A sends an IUC message in unicast mode to a UE-B. An IUC message transmitted as a result of an internal condition at a UE-A can be unicast to a UE-B, when it includes preferred resources, or can be unicast, groupcast or broadcast to a UE-B when it includes non-preferred resources. A UE-A can determine preferred or non-preferred resources for a UE-B based on its own sensing taking into account the SL-RSRP measurement of the sensed data and the priority of the sensed data, i.e., the priority field of the decoded PSCCH during sensing as well as the priority the traffic transmitted by a UE-B in case of request-based IUC or a configured priority in case of condition-based IUC. Non-preferred resource to a UE-B can also be determined to avoid the half-duplex problem, where a UE-A cannot receive data from a UE-B in the same slot a UE-A is transmitting.

In another example, in scheme 2, a UE-A can provide to another UE-B an indication that resources reserved for a UE-B's transmission, whether or not a UE-A is the destination UE, are subject to conflict with a transmission from another UE. A UE-A determines the conflicting resources based on the priority and RSRP of the transmissions involved in the conflict. A UE-A can also determine a presence of a conflict due to the half-duplex problem, where a UE-A cannot receive a reserved resource from a UE-B at the same time a UE-A is transmitting. When a UE-B receives a conflict indication for a reserved resource, it can re-select new resources to replace them. The conflict information from a UE-A is sent in a PSFCH channel separately (pre-) configured from the PSFCH of SL-HARQ operation. The timing of the PSFCH channel carrying conflict information can be based on the SCI indicating reserved resource, or based on the reserved resource.

In both schemes, a UE-A can identify resources according to a number of conditions which are based on the SL-RSRP of the resources in question as a function of the traffic priority, and/or whether a UE-A may be unable to receive a transmission from a UE-B, due to performing its own transmission, i.e., a half-duplex problem. The purpose of this exchange of information is to give a UE-B information about resource occupancy acquired by a UE-A which a UE-B may not be able to determine on its own due to hidden nodes, exposed nodes, persistent collisions, etc.

3GPP Release 16 is the first NR release to include sidelink through work item "5G V2X with NR sidelink," the mechanisms introduced focused mainly on vehicle-to-everything (V2X) and can be used for public safety when the service requirement can be met. Release 17 extends sidelink support to more use cases through work item "NR Sidelink enhancement" (RP-201385). The objectives of Rel-17 SL include: (1) resource allocation enhancements that reduce power consumption. (2) enhanced reliability and reduced latency.

Release 18 considers further evolution of the NR SL air interface for operation in unlicensed bands, beam-based operation in FR2, SL carrier aggregation and co-channel co-existence between LTE SL and NR SL.

On the Uu interface a beam is determined by either of: (1) a TCI state, that establishes a quasi-colocation (QCL) relationship between a source reference signal (e.g., SSB and/or CSI-RS) and a target reference signal; or (2) a spatial relation information that establishes an association to a source reference signal, such as SSB or CSI-RS or SRS.

In either case, the ID of the source reference signal identifies the beam.

Terminology such as TCI, TCI states, SpatialRelationInfo, target RS, reference RS, and other terms is used for illustrative purposes and is therefore not normative. Other terms that refer to same functions can also be used.

Rel-17 introduced the unified TCI framework, where a unified or master or main or indicated TCI state is signaled or indicated to the UE. The unified or master or main or indicated TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state that can be used at least for UE-dedicated DL channels; and (3) in case of separate TCI state indication, wherein different beams are used for DL and UL channels, a UL TCI state that can be used at least for UE-dedicated UL channels.

The unified (master or main or indicated) TCI state is a DL or a Joint TCI state of UE-dedicated reception on PDSCH/PDCCH and the CSI-RS applying the indicated TCI state and/or an UL or a Joint TCI state for dynamic-grant/configured-grant based PUSCH, PUCCH, and SRS applying the indicated TCI state.

The unified TCI framework applies to intra-cell beam management, wherein, the TCI states have a source RS that is directly or indirectly associated, through a quasi-co-location relation, e.g., spatial relation, with an SSB of a serving cell (e.g., the TCI state is associated with a TRP of a serving cell). The unified TCI state framework also applies to inter-cell beam management, wherein a TCI state can have a source RS that is directly or indirectly associated, through a quasi-co-location relation, e.g., spatial relation, with an SSB of cell that has a physical cell identity (PCI) different from the PCI of the serving cell (e.g., the TCI state is associated with a TRP of a cell having a PCI different from the PCI of the serving cell). In Rel-17, UE-dedicated channels can be received and/or transmitted using a TCI state associated with a cell having a PCI different from the PCI of the serving cell. While the common channels can be received and/or transmitted using a TCI state associated with the serving cell (e.g., not associated with a cell having a PCI different from the PCI of the serving cell).

Common channels can include: (1) channels carrying system information (e.g., SIB) with a DL assignment carried by a DCI in PDCCH having a CRC scrambled by SI-RNTI and transmitted in Type0-PDCCH CSS set; (2) channels carrying other system information with a DL assignment carried by a DCI in PDCCH having a CRC scrambled by SI-RNTI and transmitted in Type0A-PDCCH CSS set; (3) channels carrying paging or short messages with a DL assignment carried by a DCI in PDCCH having a CRC scrambled by P-RNTI and transmitted in Type2-PDCCH CSS set; and (4) channels carrying RACH related channels with a DL assignment or UL grant carried by a DCI in PDCCH having a CRC scrambled by RA-RNTI or TC-RNTI and transmitted in Type1-PDCCH CSS set.

A DL-related DCI Format (e.g., DCI Format 1_1 or DCI Format 1_2), with or without DL assignment, can indicate to a UE through a field "transmission configuration indication" a TCI state code point, wherein, the TCI state codepoint can be one of (1) a DL TCI state; (2) an UL TCI state; (3) a joint TCI state; or (4) a pair of DL TCI state and UL TCI state. TCI state code points are activated by MAC CE signaling.

Quasi-co-location (QCL) relation can be quasi-location with respect to one or more of the following relations (e.g., 3GPP standard specification TS 38.214): (1) Type A, {Doppler shift, Doppler spread, average delay, delay spread}; (2) Type B, {Doppler shift, Doppler spread}; (3) Type C, {Doppler shift, average delay}; and (4) Type D, {Spatial Rx parameter}.

In addition, quasi-co-location relation can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main or indicated) TCI state applies at least to UE dedicated DL and UL channels. The unified (master or main or indicated) TCI can also apply to other DL and/or UL channels and/or signals e.g., non-UE dedicated channel and sounding reference signal (SRS).

A "reference RS" corresponds to a set of characteristics of a DL beam or an UL TX beam, such as a direction, a precoding/beamforming, a number of ports, and so on.

On a Uu interface, a TCI state can be used for beam indication. It can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be a gNB or UE panel specific or common across panels. In some examples, the uplink TCI state can be replaced by SRS resource indicator (SRI).

Figure 9:
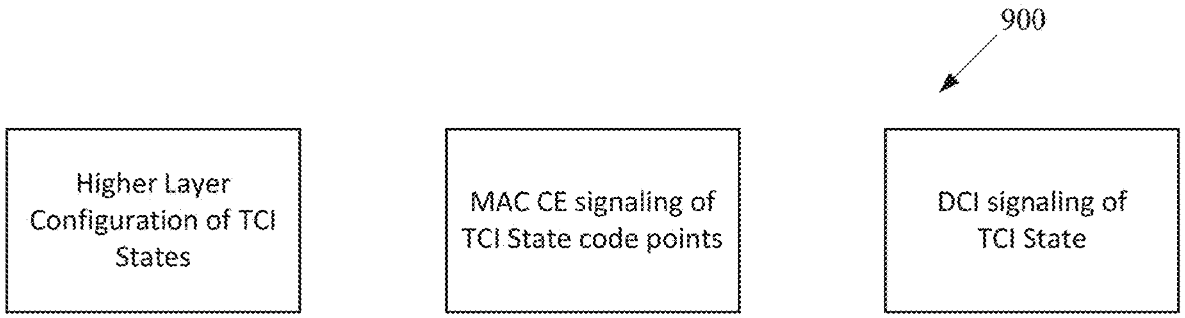
FIG. 9 illustrates examples of MAC CE signaling according to embodiments of the present disclosure.

FIG. 9 illustrates examples of MAC CE signaling 900 according to embodiments of the present disclosure. An embodiment of the MAC CE signaling 900 shown in FIG. 9 is for illustration only.

A UE can be configured/updated through higher layer RRC signaling (as illustrated in FIG. 9) a set of TCI States with N elements. In one example, DL and joint TCI states are configured by higher layer parameter DLorJoint-TCIState, wherein, the number of DL and Joint TCI state is $N_{DJ}$. UL TCI state are configured by higher layer parameter UL-TCIState, wherein the number of UL TCI state is $N_U$. $N=N_{DJ}+N_U$. The DLorJoint-TCIState can include DL or Joint TCI states that belong to a serving cell, e.g., the source RS of the TCI state is associated with the serving cell (the PCI of the serving cell), additionally, the DL or Joint TCI states can be associated with a cell having a PCI different from the PCI of the serving cell, e.g., the source RS of the TCI state is associated with a cell having a PCI different from the PCI of the serving cell. The UL-TCIState can include UL TCI states that belong to a serving cell, e.g., the source RS of the TCI state is associated with the serving cell (the PCI of the serving cell), additionally, the UL TCI states can be associated with a cell having a PCI different from the PCI of the serving cell, e.g., the source RS of the TCI state is associated with a cell having a PCI different from the PCI of the serving cell.

A MAC CE signaling (as illustrated in FIG. 9) includes activating a subset of M (M≤N) TCI states or TCI state code points from the set of N TCI states, wherein a code point is signaled in the "transmission configuration indication" field a DCI used for indication of the TCI state. A codepoint can include one TCI state (e.g., DL TCI state or UL TCI state or Joint (DL and UL) TCI state). Alternatively, a codepoint can include two TCI states (e.g., a DL TCI state and an UL TCI state). L1 control signaling (i.e., Downlink Control Information (DCI)) updates the UE's TCI state, wherein the DCI includes a "transmission configuration indication" (beam indication) field e.g., with m bits (such that $M \leq 2^m$), the TCI state corresponds to a code point signaled by MAC CE. A DCI used for indication of the TCI state can be DL related DCI Format (e.g., DCI Format 1_1 or DCI Format 1_2), with a DL assignment or without a DL assignment.

The present disclosure considers power control for SL in FR2. SL power control is based on DL pathloss-based open loop control power, and SL pathloss-based open loop power control. DL pathloss-based open loop power control uses a PL-RS from the gNB (e.g., a DL PL-RS) associated with a TCI state or spatial relation to determine the PL between the gNB and the UE. In the present disclosure, it is provided that how the PL-RS for the gNB can be determined for SL power control. SL pathloss-based open loop power control uses the pathloss between the SL transmitting UE and the SL receiving UE to calculate the power from the SL transmitting UE. The pathloss depends on the beam-pair used between the transmitting UE and the receiving UE. In the present disclosure, it is provided that how the PL between the transmitting UE and the receiving UE is determined in a beam-based SL (e.g., PC5) interface. Finally, in the present disclosure, it is provided that how to determine the power control parameters such as P0 and alpha in a beam-based SL (e.g., PC5) interface.

3GPP Release 16 is the first NR release to include sidelink through work item "5G V2X with NR sidelink," the mechanisms introduced focused mainly on vehicle-to-everything (V2X) and can be used for public safety when the service requirement can be met. Release 17 extends sidelink support to more use cases through work item "NR Sidelink enhancement.". Release 18 considers further evolution of the NR SL air interface for operation in unlicensed bands, beam-based operation in FR2, SL carrier aggregation and co-channel co-existence between LTE SL and NR SL. One of the key features of NR is its ability to support beam-based operation. This is especially important for operation in FR2 which suffers a higher propagation loss. In Rel-16 and Rel-17 the main focus of developing SL was FR1. Indeed, the frequency bands supported for SL in Rel-16 and Rel-17 are all sub-6 GHZ frequencies (bands n14, n38, n47, and n79). One of the objectives of Rel-18 is to expand SL to FR2, while SL supports SL phase tracking reference signal (PTRS), an important feature to support operation in FR2, i.e., beam management, is missing. In the present disclosure, aspects related SL power control is provided in a beam-based SL (e.g., PC5) interface.

An open loop power control uses the pathloss estimate between the gNB and transmitting SL UE (for DL pathloss-based open loop-based power control) and the pathloss estimate between the transmitting SL UE and the receiving SL UE (for SL pathloss-based open loop-based power control) to determine the transmit power of the SL transmitting UE. The pathloss estimate depends on the beam used between the SL transmitting UE and the SL receiving UE, as well as the corresponding beam to or from the gNB. In the present disclosure, it is provided that how to determine the beam for PL calculation and the associated procedure and signaling. It is also provided that how to determine open loop parameters such as P0 and alpha based on the beam selected.

The present disclosure relates to a 5G/NR communication system.

The present disclosure considers aspects related to power SL communication in FR2: (1) determination of the DL pathloss including associated procedures and signaling; (2) determination of the SL pathloss including associated procedures and signaling; and (3) determination of open loop power control parameters (e.g., P0 and alpha) for a beam-based SL (e.g., PC5) interface.

In SL, "reference RS" can correspond to a set of characteristics for SL beam, such as a direction, a precoding/beamforming, a number of ports, and so on. This can correspond to a SL receive beam or to a SL transmit beam. At least two UEs are involved in a SL communication. It is referred to a first UE as a UE-A and to second UE as a UE-B. In one example, a UE-A is transmitting SL data on PSSCH/PSCCH, and a UE-B is receiving the SL data on PSSCH/PSCCH, the receive-transmit roles can be reversed.

For mmWave bands (or FR2) or for higher frequency bands (such as >52.6 GHz) where multi-beam operation is especially relevant, a transmission-reception process includes a receiver in a second UE (e.g., a UE-B) selecting a receive (RX) beam for a given TX beam from a first UE (e.g., a UE-A). During the initiation of a communication session between a UE-A and a UE-B a beam pair is determined for communication from a UE-A to a UE-B, i.e., a transmit beam from a UE-A is paired with a receive beam from a UE-B. A beam pair is also determined for communication from a UE-B to a UE-A, i.e., a transmit beam from a UE-B is paired with a receive beam from a UE-A.

In the present disclosure, a beam is also referred to a spatial domain filter. For example, a transmit beam is a spatial domain transmission (or transmit) filter, and a receive beam is a spatial domain reception (or receive) filter.

In the present disclosure, an RRC signaling (e.g., configuration by RRC signaling) includes the following: (1) RRC signaling over the Uu interface, this can be system information block (SIB)-based RRC signaling (e.g., SIBI or other SIB) or RRC dedicated signaling that is sent to a specific UE, and/or (2) PC5-RRC signaling over the PC5 or SL interface.

In the present disclosure MAC CE signaling includes: (1) MAC CE signaling over the Uu interface, and/or (2) MAC CE signaling over the PC5 or SL interface.

In the present disclosure, a L1 control signaling includes: (1) L1 control signaling over the Uu interface, this can include (1a) DL control information (e.g., DCI on PDCCH) and/or (1b) UL control information (e.g., UCI on PUCCH or PUSCH), and/or (2) SL control information over the PC5 or SL interface, this can include (2a) first stage sidelink control information (e.g., first stage SCI on PSCCH), and/or (2b) second stage sidelink control information (e.g., second stage SCI on PSSCH) and/or (2c) feedback control information (e.g., control information carried on PSFCH).

In the present disclosure, a beam can be identified for communication between a first UE and a second UE. In one example for the first UE, a same beam is used to transmit PSSCH/PSCCH and PSFCH from the first UE to the second UE. In one example, for the first UE, a same beam is used to receive PSSCH/PSCCH and PSFCH at the first UE from the second UE. In one example for the first UE, different beams are used to transmit PSSCH/PSCCH and PSFCH from the first UE to the second UE. In one example, for the first UE, different beams are used to receive PSSCH/PSCCH and PSFCH at the first UE from the second UE. In one example for the first UE, different beams are used to transmit PSSCH and PSCCH from the first UE to the second UE. In one example, for the first UE, different beams are used to receive PSSCH and PSCCH at the first UE from the second UE. The roles of the first and second UEs can be interchanged.

In one example, a UE can have beam correspondence, without beam sweeping, between the transmit beam and receive beam, for example, if the transmit beam to a second UE is known, the receive beam from the second UE is also known without beam sweeping. In one example, a UE can have beam correspondence, without beam sweeping, between the transmit beam and receive beam, for example, if the receive beam from a second UE is known, the transmit beam to the second UE is also known without beam sweeping. In one example, a UE performs beam sweeping to determine a receive beam from a second UE, regardless of whether or not it knows a transmit beam to the second UE. In one example, a UE performs beam sweeping to determine a transmit beam to a second UE, regardless of whether or not it knows a receive beam from the second UE.

In the present disclosure, without the loss of any generality, a UE-A is the SL UE transmitting PSSCH/PSCCH or receiving PSFCH and a UE-B is the SL UE receiving PSSCH/PSCCH or transmitting PSFCH, unless otherwise indicated. Communication has been established between a UE-A and a UE-B (e.g., for PSSCH/PSCCH or PSFCH) and a beam pair has been determined, e.g., a UE-A transmits PSSCH/PSCCH on beam UATX0 and a UE-B receives PSSCH/PSCCH on beam UBRX0.

Figure 10:
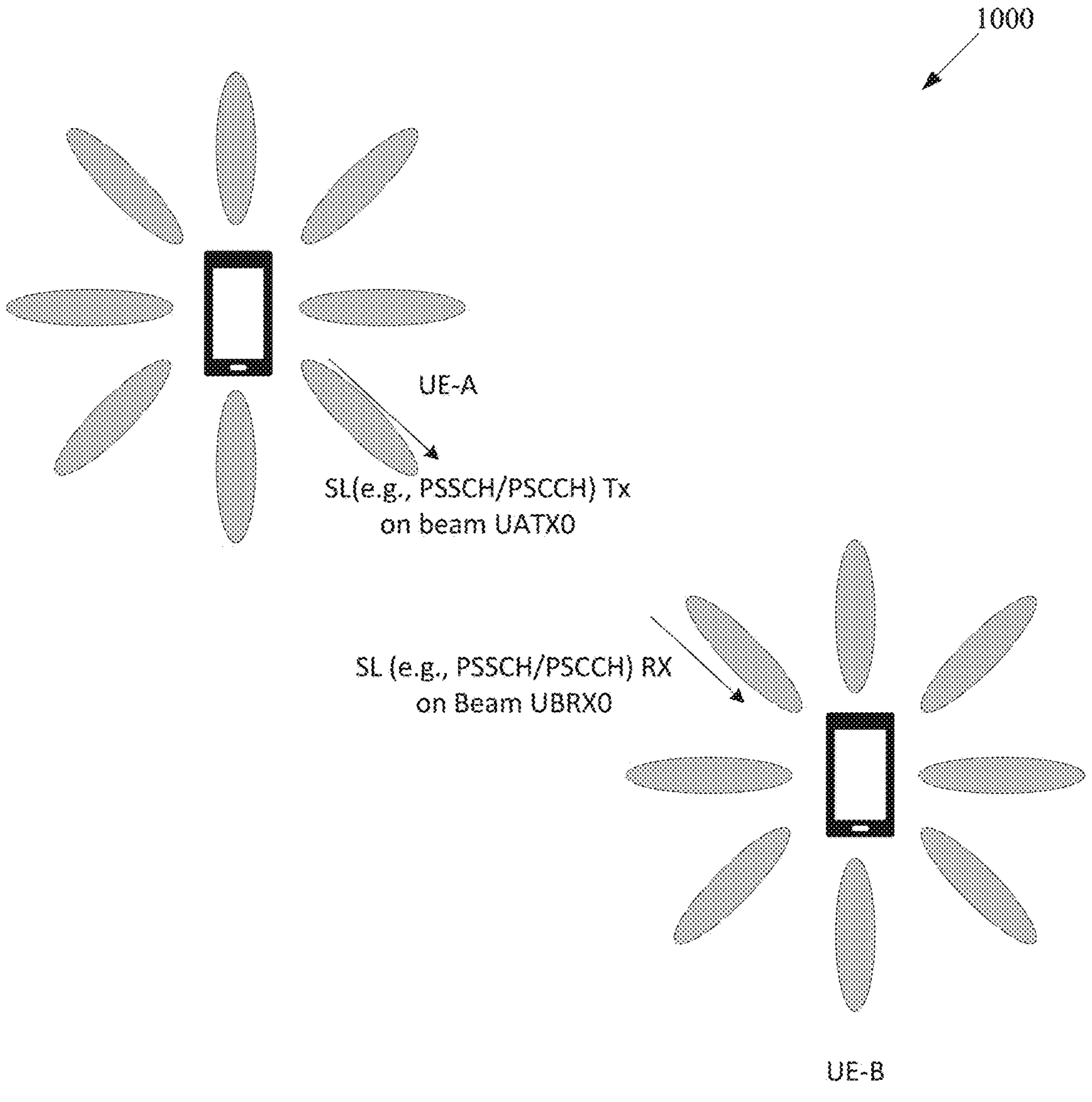
FIGS. 10 to 12 illustrate examples of UE communication procedures according to embodiments of the present disclosure.
Figure 11:
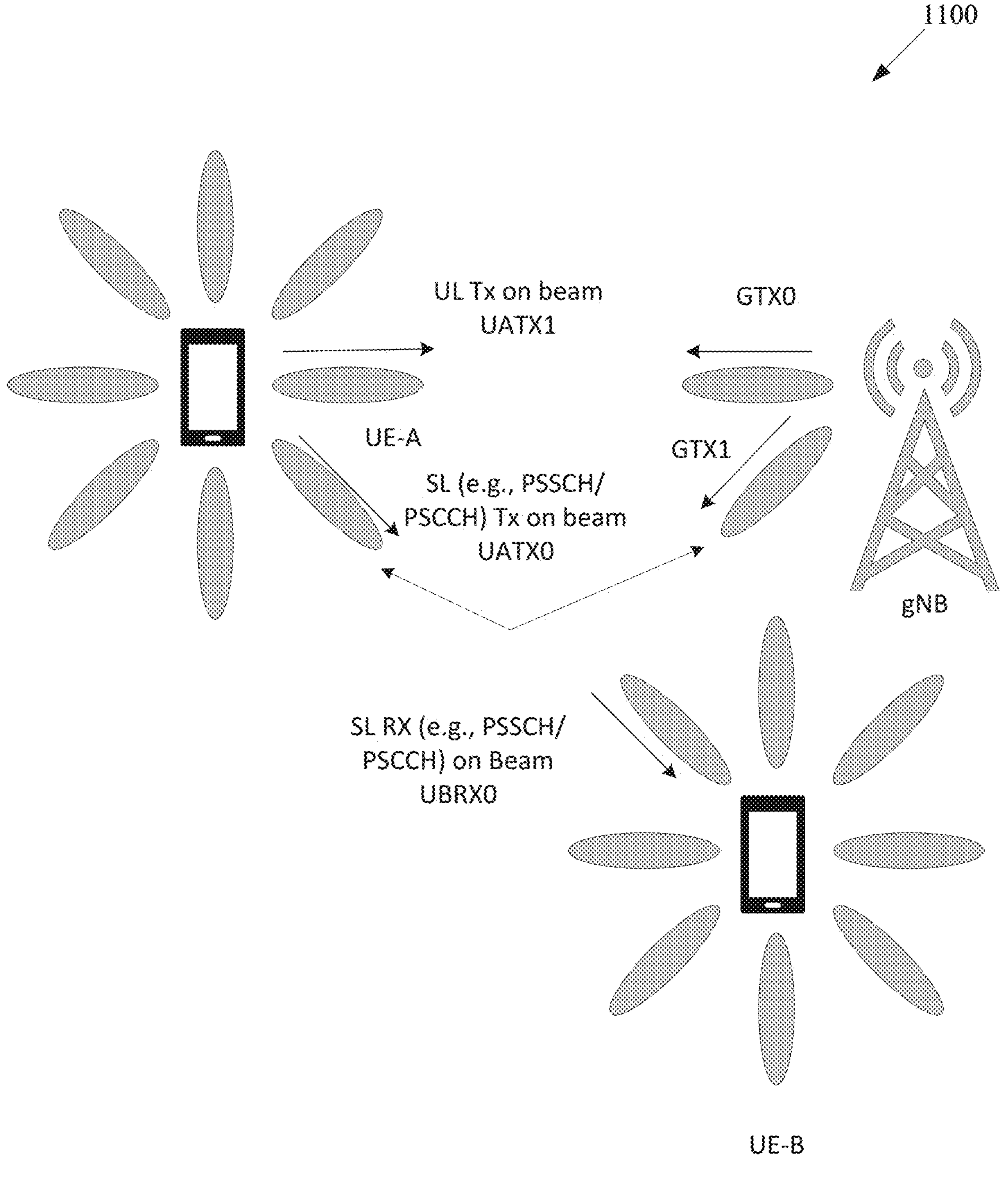
Figure 12:
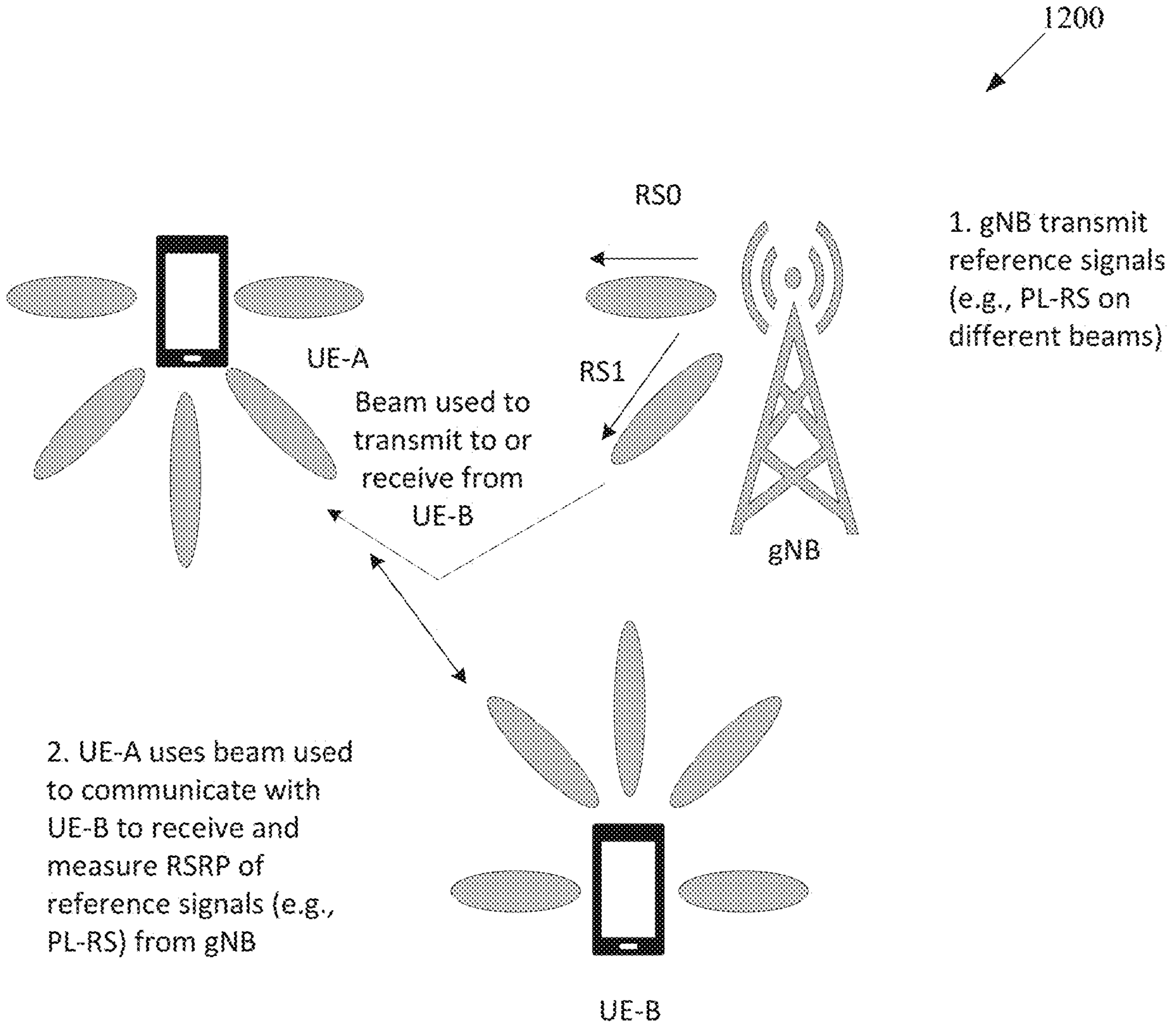

FIGS. 10 to 12 illustrate examples of UE communications 1000, 1100, and 1200 according to embodiments of the present disclosure. An embodiment of the UE communications 1000, 1100, and 1200 shown in FIGS. 10 to 12 are for illustration only.

As mentioned in the present disclosure, for S-SSB, the UE can determine the transmit power based on open loop power control as $$P_{S-SSB}(i)=\min\left(P_{CMAX},\ P_{O,S-SSB}+10\log_{10}\left(2^{\mu}\cdot M_{RB}^{S-SSB}\right)+\alpha_{S-SSB}\cdot PL\right).$$

For S-SSB, only DL pathloss-based open loop power control is used.

As mentioned in the present disclosure, for PSSCH, the UE can determine the transmit power based on open loop power control as:

$$P_{PSSCH}(i)=\min(P_{CMAX},P_{MAX,CBR},\min(P_{PSSCH,D}(i),P_{PSSCH,SL}(i)))$$

where parameters are determined as shown in TABLE 10.

TABLE 10

| Parameters for power control |
|---|
| - $P_{PSSCH,D}(i)$ is the component for DL pathloss-based open loop power control, which is given by: $P_{PSSCH,D}(i) = P_{O,D}$, $10\log_{10}(2^{\mu}\cdot M_{RB}^{PSSCH}(i)) + \alpha_D \cdot PL_D$. |
| - $P_{PSSCH,SL}(i)$ is the component for SL pathloss-based open power control, which is given by: $P_{PSSCH,SL}(i) = P_{O,SL}$, $10\log_{10}(2^{\mu}\cdot M_{RB}^{PSSCH}(i)) + \alpha_{SL} \cdot PL_{SL}$ |

As described in the present disclosure, for one PSFCH transmission, the UE can determine the transmit power based on open loop power control as: $P_{PSFCH,one}=P_{O,PSFCH}+10\log_{10}(2^{\mu})+\alpha_{PSFCH}\cdot PL$.

For PSFCH, only DL pathloss-based open loop power control is used in the previous equation. However, it is possible to extend PSFCH power control to include SL pathloss-based open power control at least for scenarios where the PSFCH is unicast to one UE, in which case the SL path-loss can be the path-loss between the two UEs of the unicast link. For example, the PSFCH power control equation for one transmission can be: $P_{PSFCH,one}=\min(P_{PSFCH,one,D}(i), P_{PSFCH,one,SL}(i)$ where parameters are determined as shown in TABLE 11.

TABLE 11

| Parameters for power control |
|---|
| - $P_{PSFCH,one,D}(i)$ is the component for DL pathloss-based open loop power control, which can be given by: $P_{PSFCH,one,D}(i) = P_{O,D,PSFCH} + 10\log_{10}(2^{\mu}) + \alpha_{D,PSFCH} \cdot PL_D$. |
| - $P_{PSSCH,SL}(i)$ is the component for SL pathloss-based open power control, which can be given by: $P_{PSSCH,one,SL}(i) = P_{O,SL,PSFCH} + 10\log_{10}(2^{\mu}) + \alpha_{SL,PSFCH} \cdot PL_{SL}$ |

In the aforementioned equations, the path-loss can depend on the beam used for SL transmission. The power control parameters, e.g., P0 and alpha, can be beam independent or can depend on the beam used for SL transmission. The present disclosure further considers these aspects.

The DL pathloss-based open power control depends on the DL path-loss, which is given by $PL_D=PL_{b,f,c}(q_d)$ when the active SL BWP is on serving cell c. $q_d$ is the RS resource for determining the path-loss. In Rel-16 SL, this is given by TABLE 12.

TABLE 12

| Path-loss determination |
|---|
| ○ The RS resource $q_d$ for determining the path-loss is given by:<br>■ When the UE is configured to monitor PDCCH for detection of DCI Format 0_0 in serving cell c: RS resource used for determining the power of a PUSCH transmission scheduled by DCI Format 0_0 in serving cell c.<br>■ When the UE is not configured to monitor PDCCH for detection of DCI Format 0_0 in serving cell c: RS resource corresponding to SS/PBCH block used by the UE to obtain the MIB. |

As illustrated in FIG. 11, when a UE-A communicates with a UE-B, it uses transmit beam UATX0, e.g., to transmit PSSCH/PSCCH or other SL transmissions. However, when a UE-A communicates with the gNB it uses UATX1. To calculate the path-loss for UL transmissions for open loop power control from a UE-A to a gNB, it seems natural to use a beam-pair based on UATX1 and GTX0, as this is the beam pair used when communicating between a UE-A and the gNB. For example, the gNB can transmit a reference signaling using beam GTX0 and the gNB receives and measures the RSRP of the transmitted signal using a receive beam corresponding to UATX1 (for example that receive beam can be denoted as UARX1), the difference in dB (or the ratio in absolute units) between the transmit power on beam GTX0 from the gNB and receive RSRP on beam UARX1 at a UE-A can be used to determine the path-loss between a UE-A and the gNB to be used to control the UL transmit power from a UE-A to the gNB.

However, as illustrated in FIG. 11, when a UE-A communicates with a UE-B, a UE-A uses beam UATX0. A transmission on beam UATX0 causes a different amount of interference at the gNB than a transmission from a UE-A on beam UATX1 due to the use of different beams (or different spatial filters). Hence, to determine the DL pathloss-based open loop power control component for SL transmission, the path-loss determined based on a spatial filter associated with beam UATX0 is provided.

In one example, the gNB can transmit multiple downlink signals on multiple DL beams as illustrated in FIG. 12. For example, signal RS0 is transmitted on beam GTX0, signal RS1 is transmitted on beam GTX1, . . . and so on. In one example, RS0, RS1, . . . can be Synchronization Signal Blocks (SSBs). In one example, RS0, RS1, . . . can be Channel State Information-Reference Signals (CSI-RS), e.g., periodic CSI-RS. In one example, RS0, RS1, . . . can be either SSBs or CSI-RS.

In one example, as illustrated in FIG. 12, a UE-A receives and measures the signal, from the gNB, on a beam (spatial domain receive filter) corresponding to a beam (spatial domain transmit filter) UATX0, wherein beam (spatial domain transmit filter) UATX0 is used for SL transmission (e.g., PSSCH/PSCCH transmission or PSFCH transmission) to a UE-B. In another example, as illustrated in FIG. 12, a UE-A receives and measures the signal on a beam (spatial domain receive filter) UARX0, wherein beam (spatial domain transmit filter) UARX0 is used for SL reception (e.g., PSFCH reception or PSSCH/PSCCH reception) from a UE-B. In one example, a beam (spatial domain receive filter) corresponding to beam (spatial domain transmit filter) UATX0 used for SL transmission (e.g., PSSCH/PSCCH transmission or PSFCH transmission) to a UE-B, is the same as a beam (spatial domain receive filter) used for SL reception (e.g., PSFCH reception or PSSCH/PSCCH reception) from a UE-B, e.g., this can be the case of beam correspondence between received and transmit beams.

In one example, a UE-A determines the PL to the gNB based on the highest measured RSRP of a reference signal (e.g., PL-RS) transmitted by the gNB and using a beam (spatial domain receive filter) corresponding to a beam (spatial domain transmit filter) used for SL transmission (e.g., PSSCH/PSCCH transmission or PSFCH transmission) to a UE-B. In one example, a UE-A determines the PL to the gNB based on the highest measured RSRP of a reference signal (e.g., PL-RS) transmitted by the gNB and using a beam (spatial domain receive filter) used for SL reception (e.g., PSFCH reception or PSSCH/PSCCH reception) from a UE-B. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, a UE-A determines the PL for each reference signal (e.g., PL-RS) transmitted by the gNB and using a beam (spatial domain receive filter) corresponding to beam (spatial domain transmit filter) used for SL transmission (e.g., PSSCH/PSCCH transmission or PSFCH transmission) to a UE-B, the PL is determined based on the reference signal that gives the smallest PL. In one example, a UE-A determines the PL for each reference signal (e.g., PL-RS) transmitted by the gNB and using a beam (spatial domain receive filter) used for SL reception (e.g., PSFCH reception or PSSCH/PSCCH reception) to a UE-B, the PL is determined based on the reference signal that gives the smallest PL. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, the DL pathloss-based open power control of a SL transmission from a UE depends on the DL path-loss of the UE, which is given by $PL_D=PL_{b,f,c}(q_d)$ when the active SL BWP is on serving cell c. $q_d$ is the RS resource for determining the path-loss. The RS resource $q_d$ for determining the DL path-loss is given by the RS (e.g., PL-RS) transmitted by the gNB, and received and measured by a beam (spatial domain receive filter) corresponding to the beam (spatial domain transmit filter) used for the SL transmission, with the highest measured RSRP or lowest calculated path-loss. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, the DL pathloss-based open power control of a first SL transmission from a first UE to a second UE depends on the DL path-loss of the first UE, which is given by $PL_D=PL_{b,f,c}(q_d)$ when the active SL BWP is on serving cell c. $q_d$ is the RS resource for determining the path-loss. The RS resource $q_d$ for determining the DL path-loss is given by the RS (e.g., PL-RS) transmitted by the gNB, and received and measured by a beam (spatial domain receive filter) used to receive a second SL transmission from the second UE to the first UE, with the highest measured RSRP or lowest calculated path-loss. In one example, the SL first transmission can be S-SSB. In one example, the first SL transmission can be PSSCH/PSCCH. In one example, the first SL transmission can be PSFCH. In one example, the first SL transmission can be SL positioning reference signal (e.g., SL PRS).

In a one example, the DL pathloss-based open power control of a SL transmission from a UE depends on the DL path-loss of the UE, which is given by $PL_D=PL_{b,f,c}(q_d)$ when the active SL BWP is on serving cell c. The UE can determine the RS resource $q_d$ for determining the path-loss as: (1) When the UE is configured to monitor PDCCH for detection of DCI Format 0_0 in serving cell c: RS resource used for determining the power of a PUSCH transmission scheduled by DCI Format 0_0 in serving cell c. (2) When the UE is not configured to monitor PDCCH for detection of DCI Format 0_0 in serving cell c: RS resource corresponding to SS/PBCH block used by the UE to obtain the MIB. The path-loss is calculated using a beam (spatial domain receive filter) corresponding to the beam (spatial domain transmit filter) used for the SL transmission (i.e., the RS resource $q_d$ is received on and the RSRP (for determining the PL) is measured using a beam (spatial domain receive filter) corresponding to the beam (spatial domain transmit filter) used for the SL transmission). In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In a one example, the DL pathloss-based open power control of a first SL transmission from a first UE to a second UE depends on the DL path-loss of the first UE, which is given by $PL_D=PL_{b,f,c}(q_d)$ when the active SL BWP is on serving cell c. The first UE can determine the RS resource $q_d$ for determining the path-loss as: (1) When the first UE is configured to monitor PDCCH for detection of DCI Format 0_0 in serving cell c: RS resource used for determining the power of a PUSCH transmission scheduled by DCI Format 0_0 in serving cell c. (2) When the first UE is not configured to monitor PDCCH for detection of DCI Format 0_0 in serving cell c: RS resource corresponding to SS/PBCH block used by the first UE to obtain the MIB. The path-loss is calculated using a beam (spatial domain receive filter) used to receive a second SL transmission from the second UE to the first UE (i.e., the RS resource $q_d$ is received on and the RSRP (for determining the PL) is measured using a beam (spatial domain receive filter) used to receive a second SL transmission from the second UE to the first UE). In one example, the first SL transmission can be S-SSB. In one example, the first SL transmission can be PSSCH/PSCCH. In one example, the first SL transmission can be PSFCH. In one example, the first SL transmission can be SL positioning reference signal (e.g., SL PRS).

In a one example, the DL pathloss-based open power control of a SL transmission from a UE depends on the DL path-loss of the UE, which is given by $PL_D=PL_{b,f,c}(q_d)$ when the active SL BWP is on serving cell c. The UE can determine the RS resource $q_d$ for determining the path-loss as the PL-RS associated with or included in the indicated or unified TCI state used for UL transmissions of the UE (e.g., TCI state can be an UL TCI state or a joint TCI state). The path-loss is calculated using a beam (spatial domain receive filter) corresponding to the beam (spatial domain transmit filter) used for SL transmission (i.e., the RS resource $q_d$ is received on and the RSRP (for determining the PL) is measured using a beam (spatial domain receive filter) corresponding to the beam (spatial domain transmit filter) used for SL transmission). In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In a one example, the DL pathloss-based open power control of a first SL transmission from a first UE to a second UE depends on the DL path-loss of the first UE, which is given by $PL_D=PL_{b,f,c}(q_d)$ when the active SL BWP is on serving cell c. The first UE can determine the RS resource $q_d$ for determining the path-loss as the PL-RS associated with or included in the indicated or unified TCI state used for UL transmissions of the first UE (e.g., TCI state can be an UL TCI state or a joint TCI state). The path-loss is calculated using a beam (spatial domain receive filter) used to receive a second SL transmission from the second UE to the first UE (i.e., the RS resource $q_d$ is received on and the RSRP (for determining the PL) is measured using a beam (spatial domain receive filter) used to receive a second SL transmission from the second UE to the first UE). In one example, the first SL transmission can be S-SSB. In one example, the first SL transmission can be PSSCH/PSCCH. In one example, the first SL transmission can be PSFCH. In one example, the first SL transmission can be SL positioning reference signal (e.g., SL PRS).

In one example, the DL pathloss-based open power control of a SL transmission from a UE depends on the DL path-loss of the UE, which is given by $PL_D=PL_{b,f,c}(q_d)$ when the active SL BWP is on serving cell c. The UE can determine the RS resource $q_d$ for determining the path-loss as the source RS (e.g., source RS used for UL spatial relation or source RS of QCL Type-D) of the indicated or unified TCI state used for UL transmissions of the UE (e.g., TCI state can be an UL TCI state or a joint TCI state). The path-loss is calculated using a beam (spatial domain receive filter) corresponding to the beam (spatial domain transmit filter) used for SL transmission (i.e., the RS resource $q_d$ is received on and the RSRP (for determining the PL) is measured using a beam (spatial domain receive filter) corresponding to the beam (spatial domain transmit filter) used for SL transmission). In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, the DL pathloss-based open power control of a first SL transmission from a first UE to a second UE depends on the DL path-loss of the first UE, which is given by $PL_D=PL_{b,f,c}(q_d)$ when the active SL BWP is on serving cell c. The first UE can determine the RS resource $q_d$ for determining the path-loss as the source RS (e.g., source RS used for UL spatial relation or source RS of QCL Type-D) of the indicated or unified TCI state used for UL transmissions of the first UE (e.g., TCI state can be an UL TCI state or a joint TCI state). The path-loss is calculated using a beam (spatial domain receive filter) used to receive a second SL transmission from the second UE to the first UE (i.e., the RS resource $q_d$ is received on and the RSRP (for determining the PL) is measured using a beam (spatial domain receive filter) used to receive a second SL transmission from the second UE to the first UE). In one example, the first SL transmission can be S-SSB. In one example, the first SL transmission can be PSSCH/PSCCH. In one example, the first SL transmission can be PSFCH. In one example, the first SL transmission can be SL positioning reference signal (e.g., SL PRS).

In one example, the DL pathloss-based open power control of a SL transmission from a UE depends on the DL path-loss of the UE, which is given by $PL_D=PL_{b,f,c}(q_d)$ when the active SL BWP is on serving cell c. The UE can determine the RS resource $q_d$ for determining the path-loss as the source RS (e.g., source RS of QCL Type-D) of the indicated or unified TCI state used for DL transmissions from the UE (e.g., TCI state can be an DL TCI state or a joint TCI state). The path-loss is calculated using a beam (spatial domain receive filter) corresponding to the beam (spatial domain transmit filter) used for SL transmission (i.e., the RS resource $q_d$ is received on and the RSRP (for determining the PL) is measured using a beam (spatial domain receive filter) corresponding to the beam (spatial domain transmit filter) used for SL transmission). In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, the DL pathloss-based open power control of a first SL transmission from a first UE to a second UE depends on the DL path-loss of the first UE, which is given by $PL_D=PL_{b,f,c}(q_d)$ when the active SL BWP is on serving cell c. The first UE can determine the RS resource $q_d$ for determining the path-loss as the source RS (e.g., source RS of QCL Type-D) of the indicated or unified TCI state used for DL transmissions from the first UE (e.g., TCI state can be an DL TCI state or a joint TCI state). The path-loss is calculated using a beam (spatial domain receive filter) used to receive a second SL transmission from the second UE to the first UE (i.e., the RS resource $q_d$ is received on and the RSRP (for determining the PL) is measured using a beam (spatial domain receive filter) used to receive a second SL transmission from the second UE to the first UE). In one example, the first SL transmission can be S-SSB. In one example, the first SL transmission can be PSSCH/PSCCH. In one example, the first SL transmission can be PSFCH. In one example, the first SL transmission can be SL positioning reference signal (e.g., SL PRS).

The SL pathloss-based open power control depends on the SL path-loss, which is given by $PL_{SL}$=referenceSignalPower−higher layer filtered RSRP: (1) referenceSignalPower is obtained by summing the PSSCH transmit power per RE over all antenna ports (in one example, there is one antenna port, and the summation is the power of that antenna port) and higher layer filtered across PSSCH transmission occasions using filter configuration provided by sl-FilterCoefficient; and (2) "higher layer filtered RSRP" is the SL RSRP measured by the UE receiving the PSSCH/PSCCH transmissions and reported to the UE that transmitted PSSCH/PSCCH. The SL RSRP is measured on PSSCH DMRS and filtered across PSSCH transmission occasions using filter configuration provided by sl-FilterCoefficient.

The SL path-loss between a UE-A and a UE-B depends on the beam (e.g., spatial domain transmit filter) used by a UE-A to transmit to a UE-B. If a UE-A changes the spatial transmit filter, the path-loss between a UE-A and a UE-B changes.

In one example, a UE-A transmits PSSCH/PSCCH, and a UE-B receives PSSCH/PSCCH. A UE-A obtains referenceSignalPower by summing the PSSCH transmit power per RE over all antenna ports (in one example, there is one antenna port, and the summation is the power of that antenna port) and higher layer filtered across PSSCH transmission occasions using filter configuration provided by sl-FilterCoefficient. A UE-B measures the "higher layer filtered RSRP" by measuring the SL RSRP on PSSCH DMRS and filtered across PSSCH transmission occasions using filter configuration provided by sl-FilterCoefficient. A UE-B reports the "higher layer filtered RSRP" to a UE-A, wherein the reporting can be PC5-RRC signaling and/or PC-5 MAC CE signaling and/or L1 control signaling (e.g., SCI signaling, for example second stage SCI and/or first state SCI). A UE-A calculates the SL path-loss using the obtained referenceSignalPower and reported "higher layer filtered RSRP" (e.g., SL Path-loss=referenceSignalPower−"higher layer filtered RSRP"). The SL path-loss is used for SL pathloss-based open loop power control for a SL transmission from a UE-A to a UE-B. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, a UE-A transmits PSSCH/PSCCH, and a UE-B receives PSSCH/PSCCH. A UE-A obtains referenceSignalPower by summing the PSSCH transmit power per RE over all antenna ports (in one example, there is one antenna port, and the summation is the power of that antenna port) and higher layer filtered across PSSCH transmission occasions using filter configuration provided by sl-FilterCoefficient. A UE-B measures the "higher layer filtered RSRP" by measuring the SL RSRP on PSSCH DMRS and filtered across PSSCH transmission occasions using filter configuration provided by sl-FilterCoefficient. A UE-A reports the referenceSignalPower to a UE-B, wherein the reporting can be PC5-RRC signaling and/or PC-5 MAC CE signaling and/or L1 control signaling (e.g., SCI signaling, for example second stage SCI and/or first state SCI). A UE-B calculates the SL path-loss using the reported referenceSignalPower and measured "higher layer filtered RSRP" (e.g., SL Path-loss=referenceSignalPower−"higher layer filtered RSRP"). The SL path-loss is used for SL pathloss-based open loop power control for a SL transmission from a UE-B to a UE-A. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, a UE-A transmits a SL transmission, e.g., SL PRS, and a UE-B receives the SL transmission, e.g., SL PRS. A UE-A obtains referenceSignalPower by summing the SL transmission, e.g., SL PRS transmit power per RE over all antenna ports (in one example, there is one antenna port, and the summation is the power of that antenna port) and higher layer filtered across the SL transmission, e.g., SL PRS, occasions using filter configuration provided by sl-FilterCoefficient. A UE-B measures the "higher layer filtered RSRP" by measuring the SL RSRP on the reception occasions of a SL transmission e.g., SL PRS and filtered across SL transmission, e.g., SL PRS, occasions using filter configuration provided by sl-FilterCoefficient. A UE-B reports the "higher layer filtered RSRP" to a UE-A, wherein the reporting can be PC5-RRC signaling and/or PC-5 MAC CE signaling and/or L1 control signaling (e.g., SCI signaling, for example second stage SCI and/or first state SCI). A UE-A calculates the SL path-loss using the obtained referenceSignalPower and reported "higher layer filtered RSRP" (e.g., SL Path-loss=referenceSignalPower−"higher layer filtered RSRP"). The SL path-loss is used for SL pathloss-based open loop power control for a SL transmission from a UE-A to a UE-B. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, a UE-A transmits a SL transmission, e.g., SL PRS, and a UE-B receives the SL transmission, e.g., SL PRS. A UE-A obtains referenceSignalPower by summing the SL transmission, e.g., SL PRS transmit power per RE over all antenna ports (in one example, there is one antenna port, and the summation is the power of that antenna port) and higher layer filtered across the SL transmission, e.g., SL PRS, occasions using filter configuration provided by sl-FilterCoefficient. A UE-B measures the "higher layer filtered RSRP" by measuring the SL RSRP on the reception occasions of a SL transmission, e.g., SL PRS and filtered across SL transmission, e.g., SL PRS, occasions using filter configuration provided by sl-FilterCoefficient. A UE-A reports the referenceSignalPower to a UE-B, wherein the reporting can be PC5-RRC signaling and/or PC-5 MAC CE signaling and/or L1 control signaling (e.g., SCI signaling, for example second stage SCI and/or first state SCI). A UE-B calculates the SL path-loss using the reported referenceSignalPower and measured "higher layer filtered RSRP" (e.g., SL Path-loss=referenceSignalPower−"higher layer filtered RSRP"). The SL path-loss is used for SL pathloss-based open loop power control for a SL transmission from a UE-B to a UE-A. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, a UE-A transmits PSSCH/PSCCH, and a UE-B receives PSSCH/PSCCH. In one example, a UE-A reports or indicates the spatial domain transmit filter associated with a PSSCH/PSCCH transmission. In another example, a UE-A indicates, e.g., by a flag (e.g., 1-bit flag), whether the spatial domain transmit filter associated with a PSSCH/PSCCH transmission has changed. If the spatial domain transmit filter associated with current PSSCH/PSCCH transmission and the spatial domain transmit filter associated with the previous PSSCH/PSCCH transmission are not the same (i.e., changed): (1) a UE-A resets the calculation of the "referenceSignalPower," starting with the current PSSCH/PSCCH transmission occasion; and (2) a UE-B resets the "higher layer filtered RSRP," starting with the current PSSCH/PSCCH reception occasion.

In one example, a UE receiving PSSCH/PSCCH can be configured by higher layer signaling (e.g., RRC signaling) or MAC CE signaling, or L1 control (e.g., DCI or SCI) signaling, whether or not to reset the "higher layer filtered RSRP" when the beam (e.g., transmit spatial domain filter) used to transmit PSSCH/PSCCH is changed.

In one example, a UE transmitting PSSCH/PSCCH can be configured by higher layer signaling (e.g., RRC signaling) or MAC CE signaling, or L1 control (e.g., DCI or SCI) signaling, whether or not to reset the "referenceSignalPower" when the beam (transmit spatial domain filter) used to transmit PSSCH/PSCCH is changed.

In one example, a UE-A transmits a SL transmission e.g., SL PRS, and a UE-B receives the SL transmission, e.g., SL PRS. In one example, a UE-A reports or indicates the spatial domain transmit filter associated with a SL transmission e.g., SL PRS transmission. In another example, a UE-A indicates, e.g., by a flag (e.g., 1-bit flag), whether the spatial domain transmit filter associated with a SL transmission e.g., SL PRS has changed. If the spatial domain transmit filter associated with current SL transmission e.g., SL PRS and the spatial domain transmit filter associated with the previous SL transmission e.g., SL PRS are not the same (i.e., changed): (1) a UE-A resets the calculation of the "referenceSignalPower," starting with the current SL transmission e.g., SL PRS, transmission occasion; and (2) a UE-B resets the "higher layer filtered RSRP," starting with the current SL transmission e.g., SL PRS, reception occasion.

In one example, a UE receiving a SL transmission e.g., SL PRS can be configured by higher layer signaling (e.g., RRC signaling) or MAC CE signaling, or L1 control (e.g., DCI or SCI) signaling, whether or not to reset the "higher layer filtered RSRP" when the beam (e.g., transmit spatial domain filter) used to transmit the SL transmission e.g., SL PRS, is changed.

In one example, a UE transmitting a SL transmission e.g., SL PRS can be configured by higher layer signaling (e.g., RRC signaling) or MAC CE signaling, or L1 control (e.g., DCI or SCI) signaling, whether or not to reset the "referenceSignalPower" when the beam (transmit spatial domain filter) used to the transmit SL transmission e.g., SL PRS is changed.

In one example, a UE-A transmits PSSCH/PSCCH, and a UE-B receives PSSCH/PSCCH. In one example, a UE-B reports or indicates the spatial domain receive filter associated with a PSSCH/PSCCH reception. In another example, a UE-B indicates, e.g., by a flag (e.g., 1-bit flag), whether the spatial domain receive filter associated with a PSSCH/PSCCH reception has changed. If the spatial domain receive filter associated with a next PSSCH/PSCCH reception and the spatial domain receive filter associated with the previous PSSCH/PSCCH reception are not the same: (1) a UE-A resets the calculation of the "referenceSignalPower," starting with the next PSSCH/PSCCH transmission occasion; and (2) a UE-B resets the "higher layer filtered RSRP," starting with the next PSSCH/PSCCH reception occasion.

In one example, a UE receiving PSSCH/PSCCH can be configured by higher layer signaling (e.g., RRC signaling) or MAC CE signaling, or L1 control (e.g., DCI or SCI) signaling, whether or not to reset the "higher layer filtered RSRP" when the beam (e.g., receive spatial domain filter) used to receive PSSCH/PSCCH is changed.

In one example, a UE transmitting PSSCH/PSCCH can be configured by higher layer signaling (e.g., RRC signaling) or MAC CE signaling, or L1 control (e.g., DCI or SCI) signaling, whether or not to reset the "referenceSignalPower" when the beam (e.g., receive spatial domain filter) used to receive PSSCH/PSCCH is changed.

In one example, a UE-A transmits a SL transmission e.g., SL PRS, and a UE-B receives the SL transmission e.g., SL PRS. In one example, a UE-B reports or indicates the spatial domain receive filter associated with the reception of a SL transmission e.g., SL PRS. In another example, a UE-B indicates, e.g., by a flag (e.g., 1-bit flag), whether the spatial domain receive filter associated with the reception of a SL transmission e.g., SL PRS, has changed. If the spatial domain receive filter associated with a next SL transmission e.g., SL PRS, reception occasion and the spatial domain receive filter associated with the previous SL transmission e.g., SL PRS, reception occasion are not the same: (1) a UE-A resets the calculation of the "referenceSignalPower," starting with the next SL transmission e.g., SL PRS, transmission occasion; and (2) a UE-B resets the "higher layer filtered RSRP," starting with the next SL transmission e.g., SL PRS, reception occasion.

In one example, a UE receiving a SL transmission e.g., SL PRS, can be configured by higher layer signaling (e.g., RRC signaling) or MAC CE signaling, or L1 control (e.g., DCI or SCI) signaling, whether or not to reset the "higher layer filtered RSRP" when the beam (e.g., receive spatial domain filter) used to receive the SL transmission e.g., SL PRS, is changed.

In one example, a UE transmitting a SL transmission e.g., SL PRS, can be configured by higher layer signaling (e.g., RRC signaling) or MAC CE signaling, or L1 control (e.g., DCI or SCI) signaling, whether or not to reset the "referenceSignalPower" when the beam (e.g., receive spatial domain filter) used to receive the SL transmission e.g., SL PRS, is changed.

In one example, a UE-A transmits PSSCH/PSCCH, and a UE-B receives PSSCH/PSCCH. A UE-A indicates to a UE-B whether or not to reset the "higher layer filtered RSRP." For example, a flag of "0" indicates that the "higher layer filtered RSRP" is not reset, and a flag of "1" indicates that the "higher layer filtered RSRP" is reset. Alternatively, a flag of "0" indicates that the "higher layer filtered RSRP" is reset, and a flag of "1" indicates that the "higher layer filtered RSRP" is not reset: (1) if a UE-A transmits an indication to a UE-B to reset the "higher layer filtered RSRP," the "referenceSignalPower" is reset at a UE-A starting with the current (or next) PSSCH/PSCCH transmission occasion; and/or (2) if a UE-B receives an indication from a UE-A to reset the "higher layer filtered RSRP," the "higher layer filtered RSRP" is reset at a UE-B starting with the current (or next) PSSCH/PSCCH reception occasion.

In one example, a UE-A transmits a SL transmission, e.g., SL PRS, and a UE-B receives the SL transmission, e.g., SL PRS. A UE-A indicates to a UE-B whether or not to reset the "higher layer filtered RSRP." For example, a flag of "0" indicates that the "higher layer filtered RSRP" is not reset, and a flag of "1" indicates that the "higher layer filtered RSRP" is reset. Alternatively, a flag of "0" indicates that the "higher layer filtered RSRP" is reset, and a flag of "1" indicates that the "higher layer filtered RSRP" is not reset: (1) if a UE-A transmits an indication to a UE-B to reset the "higher layer filtered RSRP," the "referenceSignalPower" is reset at a UE-A starting with the current (or next) SL transmission, e.g., SL PRS, transmission occasion; and/or (2) if a UE-B receives an indication from a UE-A to reset the "higher layer filtered RSRP," the "higher layer filtered RSRP" is reset at a UE-B starting with the current (or next) SL transmission, e.g., SL PRS, reception occasion.

In one example, a UE-A transmits PSSCH/PSCCH, and a UE-B receives PSSCH/PSCCH. A UE-B indicates to a UE-A whether or not to reset the "referenceSignalPower." For example, a flag of "0" indicates that the "referenceSignalPower" is not reset, and a flag of "1" indicates that the "referenceSignalPower" is reset. Alternatively, a flag of "0" indicates that the "referenceSignalPower" is reset, and a flag of "1" indicates that the "referenceSignalPower" is not reset: (1) if a UE-A receives an indication from a UE-B to reset the "referenceSignalPower," the "referenceSignalPower" is reset at a UE-A starting with the next (or current) PSSCH/PSCCH transmission occasion; and/or (2) if a UE-B transmits an indication to a UE-A to reset the "referenceSignal- Power," the "higher layer filtered RSRP" is reset at a UE-B starting with the next (or current) PSSCH/PSCCH reception occasion.

In one example, a UE-A transmits a SL transmission, e.g., SL PRS, and a UE-B receives the SL transmission, e.g., SL PRS. A UE-B indicates to a UE-A whether or not to reset the "referenceSignalPower." For example, a flag of "0" indicates that the "referenceSignalPower" is not reset, and a flag of "1" indicates that the "referenceSignalPower" is reset. Alternatively, a flag of "0" indicates that the "referenceSignalPower" is reset, and a flag of "1" indicates that the "referenceSignalPower" is not reset: (1) if a UE-A receives an indication from a UE-B to reset the "referenceSignalPower," the "referenceSignalPower" is reset at a UE-A starting with the next (or current) SL transmission, e.g., SL PRS, transmission occasion; and/or (2) if a UE-B transmits an indication to a UE-A to reset the "referenceSignalPower," the "higher layer filtered RSRP" is reset at a UE-B starting with the next (or current) SL transmission, e.g., SL PRS, reception occasion.

In one example, a UE-A transmits multiple reference signals or channels, e.g., $RS_n$, n=0, 1, . . . N−1, wherein the reference signals or channels can be transmitted on different beams (e.g., spatial domain transmission filters) and N is the number of reference signals that can be transmitted on different beams. A UE-B receives and measures the reference signals or channels. In one example, reference signals can have the same transmit power per RE, e.g., e.g., P. In one example, the reference signals can have different transmit power per RE e.g., $P_i$, i=0, 1, . . . N−1 wherein $P_i$ is the transmit power per RE of $RS_i$.

In one example, a UE-A can measure or calculate referenceSignalPower(n, i), which is the higher layer filter transmit power per RE to a UE-B that can be obtained by summing a reference signal transmit power per RE over all antenna ports (in one example, there is one antenna port and the summation is the power of that antenna port) and higher layer filtered across the reference signal transmission occasions using filter configuration provided by sl-FilterCoefficient for reference signal $RS_n$ in transmission occasion i. In one example, the reference signal transmission power is constant, the referenceSignalPower for a reference signal is its transmission power.

In one example, a UE-B measures the "higher layer filtered RSRP" for each reference signal reference signal $RS_n$ in transmission occasion i, which can be denoted as fRSRP(n, i).

In one example, a UE-B reports fRSRP(n, i) to a UE-A and a UE-A calculates the path-loss of $RS_n$ in transmission occasion i as PL(n, i)=referenceSignalPower(n, i)−fRSRP(n, i). The SL path-loss used for SL pathloss-based open loop power control is that associated with reference signal $RS_n$, associated with the beam or spatial domain transmit filter used by a UE-A to transmit a SL transmission to a UE-B. For example, this can be used to determine the transmit power of the SL transmission at a UE-A for SL pathloss-based open loop power control of the SL transmission. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, a UE-A reports referenceSignalPower(n, i) to a UE-B and a UE-B calculates the path-loss of $RS_n$ in transmission occasion i as PL(n,i)=referenceSignalPower(n, i)−fRSRP(n,i). In one example, a UE-A transmits a first SL transmission to a UE-B using a beam (or spatial domain transmit filter) associated with reference signal $RS_n$, a UE-B transmits a second SL transmission to a UE-A, e.g., associated with reference signal $RS_n$, the SL path-loss used for SL pathloss-based open loop power control of the second SL transmission is that associated with reference signal $RS_n$. In one example, the second SL transmission can be S-SSB. In one example, the second SL transmission can be PSSCH/PSCCH. In one example, the second SL transmission can be PSFCH. In one example, the SL second transmission can be SL positioning reference signal (e.g., SL PRS).

In one example, a UE-A reports referenceSignalPower(n, i) to a UE-B and a UE-B calculates the path-loss of $RS_n$ in transmission occasion i as PL(n,i)=referenceSignalPower(n, i)−fRSRP(n, i). In one example, a UE-B transmits a SL transmission to a UE-A and a UE-A uses a beam associated with reference signal $RS_n$ to receive the SL transmission from a UE-B, the SL path-loss used for SL pathloss-based open loop power control of the SL transmission is that associated with reference signal $RS_n$. In one example, a UE-B is aware or informed or indicated of the beam a UE-A uses to receive the SL transmission from a UE-B. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, SL TCI states or SL spatial relation are configured and/or activated for SL transmission between a first UE and a second UE. A SL TCI state or SL spatial relation can be indicated from the first UE to the second UE, wherein the SL TCI state or SL spatial relation indicates at least one of: (1) a beam for a SL transmission from the first UE to the second UE, i.e., a transmit beam (or spatial domain transmit filter) used by the first UE for the SL transmission and/or a receive beam (or spatial domain receive filter) used by the second UE for the reception of the SL transmission, (2) a beam for a SL transmission from the second UE to the first UE, i.e., the receive beam (or spatial domain receive filter) used by the first UE for the reception of the SL transmission and/or the transmit beam (or spatial domain transmit filter) used by second UE for the SL transmission.

In one example, the SL TCI state or SL spatial relation can include (or be associated with) a source RS transmitted by the first UE for indicating at least one of: (1) a beam for a SL transmission from the first UE to the second UE, (2) a beam for a SL transmission from the second UE to the first UE. In one example, the source RS is used to determine the SL path-loss for a SL transmission from the first UE to the second UE. In one example, the source RS is used to determine the SL path-loss for a SL transmission from the second UE to the first UE.

In one example, the SL TCI or SL spatial relation state can include (or be associated with) a source RS transmitted by the second UE for indicating at least one of: (1) a beam for a SL transmission from the first UE to the second UE, (2) a beam for a SL transmission from the second UE to the first UE. In one example, the source RS is used to determine the SL path-loss for a SL transmission from the first UE to the second UE. In one example, the source RS is used to determine the SL path-loss for a SL transmission from the second UE to the first UE.

In one example, the SL TCI state or SL spatial relation can include (or be associated with) a first source RS transmitted by the first UE, and a second source RS transmitted by the second UE. The first source RS can indicate at least one of: (1) a beam for a SL transmission from the first UE to the second UE, (2) a beam for a SL transmission from the second UE to the first UE. The second source RS can indicate at least one of: (1) a beam for a SL transmission from the second UE to the first UE, (2) a beam for a SL transmission from the first UE to the second UE. In one example, the first source RS is used to determine the SL path-loss for a SL transmission from the first UE to the second UE. In one example, the second source RS is used to determine the SL path-loss for a SL transmission from the second UE to the first UE. In one example, the first source RS is used to determine the SL path-loss for a SL transmission from the second UE to the first UE. In one example, the second source RS is used to determine the SL path-loss for a SL transmission from the first UE to the second UE.

In one example, the SL TCI state or SL spatial relation can include (or be associated with) a path-loss RS for determining the path-loss between the first UE and the second UE when the SL TCI state or SL spatial relation is used for a SL transmission. In one example, the path-loss RS is transmitted by the first UE. In one example, the path-loss RS is transmitted by the second UE. In one example, the path-loss RS is used to determine the SL path-loss for a SL transmission from the first UE to the second UE. In one example, the path-loss RS is used to determine the SL path-loss for a SL transmission from the second UE to the first UE.

In one example, the SL TCI state or SL spatial relation can include (or be associated with) two path-loss RSs for determining the path-loss between the first UE and the second UE when the SL TCI state or SL spatial relation is used for a SL transmission. In one example, a first path-loss RS is transmitted by the first UE, and a second path-loss RS is transmitted by the second UE. In one example, the first path-loss RS is used to determine the SL path-loss for a SL transmission from the first UE to the second UE. In one example, the second path-loss RS is used to determine the SL path-loss for a SL transmission from the second UE to the first UE. In one example, the first path-loss RS is used to determine the SL path-loss for a SL transmission from the second UE to the first UE. In one example, the second path-loss RS is used to determine the SL path-loss for a SL transmission from the first UE to the second UE.

In one example, $P_{O,D}$ for a SL transmission, i.e., P0 for DL pathloss-based open loop power control for the SL transmission is independent of $q_d$, i.e., the RS resource used to calculate the DL path-loss. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, $P_{O,D}$ for a SL transmission, i.e., P0 for DL pathloss-based open loop power control for the SL transmission depends on $q_d$, i.e., the RS resource used to calculate the DL path-loss, determined as aforementioned. There is an association between $q_d$ and P0 for DL pathloss-based open loop power control for a SL transmission. In one example, this association can be configured by higher-layer signaling (e.g., RRC signaling and/or MAC CE signaling). In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, $P_{O,D}$ for a SL transmission, i.e., P0 for DL pathloss-based open loop power control for the SL transmission depends on an indicated or unified UL TCI state or Joint TCI state or DL TCI state. There is an association between the UL TCI state or Joint TCI state, or DL TCI state and P0 for DL pathloss-based open loop power control for the SL transmission. In one example, P0 for DL pathloss-based open loop power control for the SL transmission is included in or associated with the UL TCI state or Joint TCI state or DL TCI state. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS). In one example, the P0 included in or associated with the UL TCI state or Joint TCI state, or DL TCI state can apply to any SL transmission channel or signal (e.g., S-SSB, or PSSCH/PSCCH or PSFCH or SL PRS). In one example, multiple P0 values are included in or associated with the UL TCI state or Joint TCI state or DL TCI state, wherein a P0 can apply to a specific SL transmission channel or signal, for example, there can be a first P0 value for PSSCH/PSCCH, a second P0 value for PSFCH, and so on . . . . In one example, a P0 can apply to one or more SL transmission channels or signals.

In one example, $P_{O,D}$ for a SL transmission, i.e., P0 for DL pathloss-based open loop power control for the SL transmission depends on a TCI state (e.g., UL TCI state or Joint TCI state or DL TCI state) corresponding to the spatial domain transmit filter used to transmit the SL transmission (e.g., this correspondence can be (pre-)configured by higher layers or determined by the UE). There is an association between the UL TCI state or Joint TCI state, or DL TCI state and P0 for DL pathloss-based open loop power control for the SL transmission. In one example, P0 for DL pathloss-based open loop power control for the SL transmission is included in or associated with the UL TCI state or Joint TCI state or DL TCI state. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS). In one example, the P0 included in or associated with the UL TCI state or Joint TCI state, or DL TCI state can apply to any SL transmission channel or signal (e.g., S-SSB, or PSSCH/PSCCH or PSFCH or SL PRS). In one example, multiple P0 values are included in or associated with the UL TCI state or Joint TCI state or DL TCI state, wherein a P0 can apply to a specific SL transmission channel or signal, for example, there can be a first P0 value for PSSCH/PSCCH, a second P0 value for PSFCH, and so on . . . . In one example, a P0 can apply to one or more SL transmission channels or signals.

In one example, $\alpha_D$ for a SL transmission, i.e., alpha for DL pathloss-based open loop power control for the SL transmission is independent of $q_d$, i.e., the RS resource used to calculate the DL path-loss. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, $\alpha_D$ for a SL transmission, i.e., alpha for DL pathloss-based open loop power control for the SL transmission depends on $q_d$, i.e., the RS resource used to calculate the DL path-loss, determined as aforementioned. There is an association between $q_d$ and alpha for DL pathloss-based open loop power control for a SL transmission. In one example, this association can be configured by higher-layer signaling (e.g., RRC signaling and/or MAC CE signaling). In one example, the SL transmission can be S-SSB.

In one example, the SL transmission can be PSSCH/PSCCH. In one example, the SL transmission can be PSFCH. In one example, the SL transmission can be SL positioning reference signal (e.g., SL PRS).

In one example, $\alpha_D$ for a SL transmission, i.e., alpha for DL pathloss-based open loop power control for the SL transmission depends on an indicated or unified UL TCI state or Joint TCI state or DL TCI state. There is an association between the UL TCI state or Joint TCI state or DL TCI state and alpha for DL pathloss-based open loop power control for the SL transmission. In one example, alpha for DL pathloss-based open loop power control for the SL transmission is included in or associated with the UL TCI state or Joint TCI state or DL TCI state. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS). In one example, the alpha included in or associated with the UL TCI state or Joint TCI state, or DL TCI state can apply to any SL transmission channel or signal (e.g., S-SSB, or PSSCH/PSCCH or PSFCH or SL PRS). In one example, multiple alpha values are included in or associated with the UL TCI state or Joint TCI state or DL TCI state, wherein an alpha can apply to a specific SL transmission channel or signal, for example, there can be a first alpha value for PSSCH/PSCCH, a second alpha value for PSFCH, and so on . . . . In one example, an alpha value can apply to one or more SL transmission channels or signals.

In one example, $\alpha_D$ for a SL transmission, i.e., alpha for DL pathloss-based open loop power control for the SL transmission depends on a TCI state (e.g., UL TCI state or Joint TCI state or DL TCI state) corresponding to the spatial domain transmit filter used to transmit the SL transmission (e.g., this correspondence can be (pre-)configured by higher layers or determined by the UE). There is an association between the UL TCI state or Joint TCI state or DL TCI state and alpha for DL pathloss-based open loop power control for the SL transmission. In one example, alpha for DL pathloss-based open loop power control for the SL transmission is included in or associated with the UL TCI state or Joint TCI state or DL TCI state. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS). In one example, the alpha included in or associated with the UL TCI state or Joint TCI state, or DL TCI state can apply to any SL transmission channel or signal (e.g., S-SSB, or PSSCH/PSCCH or PSFCH or SL PRS). In one example, multiple alpha values are included in or associated with the UL TCI state or Joint TCI state or DL TCI state, wherein an alpha can apply to a specific SL transmission channel or signal, for example, there can be a first alpha value for PSSCH/PSCCH, a second alpha value for PSFCH, and so on . . . . In one example, an alpha value can apply to one or more SL transmission channels or signals.

In the following examples, parameter P can be one or more of: (1) $P_{O,D}$ for a SL transmission, i.e., P0 for DL pathloss-based open loop power control for the SL transmission; (2) $\alpha_D$ for a SL transmission, i.e., alpha for DL pathloss-based open loop power control for the SL transmission; and (3) closed loop power control index (CLPC index) for a SL transmission, i.e., the CLPC index for DL pathloss-based open loop power control for the SL transmission.

In one example, parameter P for a SL transmission, i.e., parameter P for DL pathloss-based open loop power control for the SL transmission is independent of $q_d$, i.e., the RS resource used to calculate the DL path-loss. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, parameter P for a SL transmission, i.e., parameter P for DL pathloss-based open loop power control for the SL transmission depends on $q_d$, i.e., the RS resource used to calculate the DL path-loss, determined as aforementioned. There is an association between $q_d$ and parameter P for DL pathloss-based open loop power control for a SL transmission. In one example, this association can be configured by higher-layer signaling (e.g., RRC signaling and/or MAC CE signaling). In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, parameter P for a SL transmission, i.e., parameter P for DL pathloss-based open loop power control for the SL transmission depends on an indicated or unified UL TCI state or Joint TCI state or DL TCI state. There is an association between the UL TCI state or Joint TCI state, or DL TCI state and parameter P for DL pathloss-based open loop power control for the SL transmission. In one example, parameter P for DL pathloss-based open loop power control for the SL transmission is included in or associated with the UL TCI state or Joint TCI state or DL TCI state. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS). In one example, the parameter P included in or associated with the UL TCI state or Joint TCI state, or DL TCI state can apply to any SL transmission channel or signal (e.g., S-SSB, or PSSCH/PSCCH or PSFCH or SL PRS). In one example, multiple parameter P values are included in or associated with the UL TCI state or Joint TCI state or DL TCI state, wherein a parameter P can apply to a specific SL transmission channel or signal, for example, there can be a first parameter P value for PSSCH/PSCCH, a second parameter P value for PSFCH, and so on . . . . In one example, a parameter P value can apply to one or more SL transmission channels or signals.

In one example, parameter P for a SL transmission, i.e., parameter P for DL pathloss-based open loop power control for the SL transmission depends on a TCI state (e.g., UL TCI state or Joint TCI state or DL TCI state) corresponding to the spatial domain transmit filter used to transmit the SL transmission (e.g., this correspondence can be (pre-)configured by higher layers or determined by the UE). There is an association between the UL TCI state or Joint TCI state, or DL TCI state and parameter P for DL pathloss-based open loop power control for the SL transmissions. In one example, parameter P for DL pathloss-based open loop power control for the SL transmissions is included in or associated with the UL TCI state or Joint TCI state or DL TCI state. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS). In one example, the parameter P included in or associated with the UL TCI state or Joint TCI state, or DL TCI state can apply to any SL transmission channel or signal (e.g., S-SSB, or PSSCH/PSCCH or PSFCH or SL PRS). In one example, multiple parameter P values are included in or associated with the UL TCI state or Joint TCI state or DL TCI state, wherein a parameter P can apply to a specific SL transmission channel or signal, for example, there can be a first parameter P value for PSSCH/PSCCH, a second parameter P value for PSFCH, and so on . . . . In one example, a parameter P value can apply to one or more SL transmission channels or signals.

In one example, $P_{O,SL}$ for a SL transmission, i.e., P0 for SL pathloss-based open loop power control for the SL transmission is independent of a beam or a TCI state or a spatial relation or reference signal used to calculate the SL path-loss. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, $P_{O,SL}$ for a SL transmission, i.e., P0 for SL pathloss-based open loop power control for the SL transmission depends on a beam or a TCI state or a spatial relation or reference signal used to calculate the SL path-loss, determined as aforementioned. In one example, the beam or TCI state or spatial is identified by an RS resource. There is an association between the RS resource identifying a beam or a TCI state or a spatial relation and P0 for SL pathloss-based open loop power control for a SL transmission. In one example, this association can be configured by higher-layer signaling (e.g., RRC signaling and/or MAC CE signaling). In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, $P_{O,SL}$ for a SL transmission, i.e., P0 for SL pathloss-based open loop power control for the SL transmission depends on a SL TCI state or SL spatial relation used for SL transmission between a first UE and a second UE. There is an association between the SL TCI state, or the SL spatial relation and P0 for SL pathloss-based open loop power control for the SL transmission. In one example, P0 for SL pathloss-based open loop power control for the SL transmission is included in or associated with the SL TCI state or the SL spatial relation. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS). In one example, the P0 included in or associated with the SL TCI state, or the SL spatial relation or reference signal can apply to any SL transmission channel or signal (e.g., S-SSB, or PSSCH/PSCCH or PSFCH or SL PRS).

In one example, multiple P0 values are included in or associated with the SL TCI state or the SL spatial relation or reference signal, wherein a P0 can apply to a specific SL transmission channel or signal, for example, there can be a first P0 value for PSSCH/PSCCH, a second P0 value for PSFCH, and so on . . . . In one example, a P0 can apply to one or more SL transmission channels or signals. In one example a P0 value is included in or associated with a SL TCI state, or a SL spatial relation or reference signal is used for a SL transmission from the first UE to the second UE and/or a SL transmission from the second UE to the first UE. In one example, a first P0 value is included in or associated with a SL TCI state or a SL spatial relation or reference signal, and a second P0 value is included in or associated with a SL TCI state or a SL spatial relation or reference signal, the first P0 value is used for a SL transmission from a first UE to a second UE and/or for a SL transmission from a second UE to a first UE, the second P0 is used for a SL transmission from a second UE to a first UE and/or for a SL transmission from a first UE to a second UE.

In one example, $\alpha_{SL}$ for a SL transmission, i.e., alpha for SL pathloss-based open loop power control for the SL transmission is independent of a beam or a TCI state or a spatial relation or reference signal used to calculate the SL path-loss. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, $\alpha_{SL}$ for a SL transmission, i.e., alpha for SL pathloss-based open loop power control for the SL transmission depends on a beam or a TCI state or a spatial relation or reference signal used to calculate the SL path-loss, determined as aforementioned. In one example, the beam or TCI state or spatial is identified by an RS resource. There is an association between RS resource identifying a beam or a TCI state or a spatial relation and alpha for SL pathloss-based open loop power control for a SL transmission. In one example, this association can be configured by higher-layer signaling (e.g., RRC signaling and/or MAC CE signaling). In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, $\alpha_{SL}$ for a SL transmission, i.e., alpha for SL pathloss-based open loop power control for the SL transmission depends on a SL TCI state or SL spatial relation used for SL transmission between a first UE and a second UE. There is an association between the SL TCI state or the SL spatial relation and alpha for SL pathloss-based open loop power control for the SL transmission. In one example, alpha for SL pathloss-based open loop power control for the SL transmission is included in or associated with the SL TCI state or SL spatial relation. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS). In one example, the alpha included in or associated with the SL TCI state or SL spatial relation, or reference signal can apply to any SL transmission channel or signal (e.g., S-SSB, or PSSCH/PSCCH or PSFCH or SL PRS). In one example, multiple alpha values are included in or associated with the SL TCI state or the SL spatial relation or reference signal, wherein an alpha can apply to a specific SL transmission channel or signal, for example, there can be a first alpha value for PSSCH/PSCCH, a second alpha value for PSFCH, and so on . . . . In one example, an alpha value can apply to one or more SL transmission channels or signals.

In one example an alpha value is included in or associated with a SL TCI state, or a SL spatial relation or reference signal is used for a SL transmission from the first UE to the second UE and/or a SL transmission from the second UE to the first UE. In one example, a first alpha value is included in or associated with a SL TCI state or a SL spatial relation or reference signal, and a second alpha value is included in or associated with a SL TCI state or a SL spatial relation or reference signal, the first alpha value is used for a SL transmission from a first UE to a second UE and/or for a SL transmission from a second UE to a first UE, the second alpha is used for a SL transmission from a second UE to a first UE and/or for a SL transmission from a first UE to a second UE.

In the following examples, parameter P can be one or more of: (1) $P_{O,SL}$ for a SL transmission, i.e., P0 for SL pathloss-based open loop power control for the SL transmission; (2) $\alpha_{SL}$ for a SL transmission, i.e., alpha for SL pathloss-based open loop power control for the SL transmission; and (3) closed loop power control index (CLPC index) for a SL transmission, i.e., the CLPC index for SL pathloss-based open loop power control for the SL transmission.

In one example, parameter P for a SL transmission, i.e., parameter P for SL pathloss-based open loop power control for the SL transmission is independent of a beam or a TCI state or a spatial relation or reference signal used to calculate the SL path-loss. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, parameter P for a SL transmission, i.e., parameter P for SL pathloss-based open loop power control for the SL transmission depends on a beam or a TCI state or a spatial relation or reference signal used to calculate the SL path-loss, determined as aforementioned. In one example, the beam or TCI state or spatial is identified by an RS resource. There is an association between the RS resource identifying a beam or a TCI state or a spatial relation and parameter P for SL pathloss-based open loop power control for a SL transmission. In one example, this association can be configured by higher-layer signaling (e.g., RRC signaling and/or MAC CE signaling). In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS).

In one example, parameter P for a SL transmission, i.e., parameter P for SL pathloss-based open loop power control for the SL transmission depends on a SL TCI state or SL spatial relation used for SL transmission between a first UE and a second UE. There is an association between the SL TCI state, or the SL spatial relation and parameter P for SL pathloss-based open loop power control for the SL transmission. In one example, parameter P for SL pathloss-based open loop power control for the SL transmission is included in or associated with the SL TCI state or the SL spatial relation. In one example, the SL transmission can be S-SSB. In one example, the SL transmission can be PSSCH/PSCCH. In one example, the SL transmission can be PSFCH. In one example, the SL transmission can be SL positioning reference signal (e.g., SL PRS). In one example, the parameter P included in or associated with the SL TCI state, or the SL spatial relation or reference signal can apply to any SL transmission channel or signal (e.g., S-SSB, or PSSCH/PSCCH or PSFCH or SL PRS). In one example, multiple parameter P values are included in or associated with the SL TCI state or the SL spatial relation or reference signal, wherein a parameter P can apply to a specific SL transmission channel or signal, for example, there can be a first parameter P value for PSSCH/PSCCH, a second parameter P value for PSFCH, and so on . . . . In one example, a parameter P can apply to one or more SL transmission channels or signals.

In one example a parameter P value is included in or associated with a SL TCI state, or a SL spatial relation or reference signal is used for a SL transmission from the first UE to the second UE and/or a SL transmission from the second UE to the first UE. In one example, a first parameter P value is included in or associated with a SL TCI state or a SL spatial relation or reference signal, and a second parameter P value is included in or associated with a SL TCI state or a SL spatial relation or reference signal, the first parameter P value is used for a SL transmission from a first UE to a second UE and/or for a SL transmission from a second UE to a first UE, the second parameter P is used for a SL transmission from a second UE to a first UE and/or for a SL transmission from a first UE to a second UE.

In one example, the UE determines the spatial domain transmission filter (e.g., Tx beam) based on the PSFCH transmissions (e.g., in a slot or in a symbol) with HARQ-ACK information with the smallest priority value (or highest priority). In there are no PSFCH transmissions (e.g., in a slot or in a symbol) with HARQ-ACK information, the UE determines the spatial domain transmission filter (e.g., Tx beam) based on the PSFCH transmissions (e.g., in the slot or in the symbol) with conflict information with the smallest priority value (or highest priority). In one example, the UE determines the spatial domain transmission filter (e.g., Tx beam) based on the PSFCH transmissions (e.g., in a slot or in a symbol) with other types of information. In one example, the UE determines the spatial domain transmission filter (e.g., Tx beam) based on the PSFCH transmissions (e.g., in a slot or in a symbol) with any information type (e.g., HARQ-ACK or conflict information or other information) with the smallest priority value (or highest priority).

In one example, the UE determines the number of PSFCH transmissions using a determined beam, as aforementioned, the UE first transmits PSFCHs with HARQ-ACK information in priority order (starting with the smallest priority value and in ascending order of priority value, i.e., from highest priority to lowest priority), until the maximum number of PSFCHs or the maximum PSFCH transmit power is reached. If not reached, then the UE transmits PSFCHs with conflict information in priority order (starting with the smallest priority value and in ascending order of priority value, i.e., from highest priority to lowest priority) until the maximum number of PSFCHs or the maximum PSFCH transmit power is reached. If PSFCHs with other types of information is defined, those can be also transmitted according to their priority order. In one example, the UE determines the number of PSFCH transmissions using a determined beam, as aforementioned, the UE transmits PSFCHs with any information type (e.g., HARQ-ACK or conflict information or other information) (starting with the smallest priority value and in ascending order of priority value, i.e., from highest priority to lowest priority), until the maximum number of PSFCHs or the maximum PSFCH transmit power is reached.

In one example, a UE with $N_{sch,Tx,PSFCH,beam}$ scheduled PSFCH transmissions for HARQ-ACK information and conflict information, on a determined spatial domain transmission filter as described in the present disclosure and capable of transmitting a maximum of $N_{max,PSFCH}$ PSFCHs, determines a number $N_{Tx,PSFCH}$ of simultaneous PSFCH transmissions, on the determined spatial domain transmission filter as described in the present disclosure and a power $P_{PSFCH,k}(i)$ for a PSFCH transmission k, $1 \leq k \leq N_{Tx,PSFCH}$, on a resource pool in PSFCH transmission occasion i on active SL BWP b of carrier f as described later in the present disclosure.

In one example, a UE with $N_{sch,Tx,PSFCH}$ scheduled PSFCH transmissions for HARQ-ACK information and conflict information, and capable of transmitting a maximum of $N_{max,PSFCH}$ PSFCHs, determines a number $N_{Tx,PSFCH}$ of simultaneous PSFCH transmissions, on a determined spatial domain transmission filter as described in the present disclosure and a power $P_{PSFCH,k}(i)$ for a PSFCH transmission k, $1 \le k \le N_{Tx,PSFCH}$, on a resource pool in PSFCH transmission occasion i on active SL BWP b of carrier f as described in TABLE 13.

TABLE 13

| PSFCH transmission |
|---|
| - if dl-P0-PSFCH is provided,<br>$P_{PSFCH,one} = P_{O,PSFCH} + 10\log_{10}(2^{\mu}) + \alpha_{PSFCH} \cdot PL$ [dBm]<br>where<br>- In one example, $P_{O,PSFCH}$ is a value of dl-P0-PSFCH-r17, if using the parameter is supported by the UE and the parameter is provided; else dl-P0-PSFCH-r16 if provided. In one example, $P_{O,PSFCH}$ depends on the spatial domain transmission filter of the PSFCH. In one example, $P_{O,PSFCH}$ depends on the spatial domain reception filter of the PSFCH in the UE receiving PSFCH. In one example, $P_{O,PSFCH}$ depends on a beam or SL TCI state or SL spatial relation or reference signal.<br>- In one example, $\alpha_{PSFCH}$ is a value of dl-Alpha-PSFCH, if provided; else, $\alpha_{PSFCH} = 1$. In one example, $\alpha_{PSFCH}$ depends on the spatial domain transmission filter of the PSFCH. In one example, $\alpha_{PSFCH}$ depends on the spatial domain reception filter of the PSFCH in the UE receiving PSFCH. In one example, $\alpha_{PSFCH}$ depends on a beam or SL TCI state or SL spatial relation or reference signal.<br>- PL is a pathloss, in one example, the pathloss depends on the spatial domain transmission filter of the PSFCH. In one example, the pathloss depends on the spatial domain reception filter of the PSFCH in the UE receiving PSFCH.<br>- if $N_{sch,Tx,PSFCH} \le N_{max,PSFCH}$ or if $N_{sch,Tx,PSFCH,beam} \le N_{max,PSFCH}$<br>- if $P_{PSFCH,one} + 10\log_{10}(N_{sch,Tx,PSFCH}) \le P_{CMAX}$, where $P_{CMAX}$ is determined for $N_{sch,Tx,PSFCH,beam}$ PSFCH transmissions<br>- $N_{Tx,PSFCH} = N_{sch,Tx,PSFCH,beam}$ and $P_{PSFCH,k}(i) = P_{PSFCH,one}$ [dBm]<br>where $N_{Tx,PSFCH}$ are the PSFCH transmissions associated (using or configured) with the determined spatial domain transmission filter as described later<br>- else<br>- UE autonomously determines $N_{Tx,PSFCH}$ PSFCH transmissions associated (using or configured) with the determined spatial domain transmission filter first with ascending order of corresponding priority field values as described in clause 16.2.4.2 of TS 38.213 over the PSFCH transmissions with HARQ-ACK information, if any, and then with ascending order of priority value over the PSFCH transmissions with conflict if any, such that $N_{Tx,PSFCH} \ge \max(1, \Sigma_{i=1}^{K} M_i)$ where $M_i$, for $1 \le i \le 8$, is a number of PSFCHs with priority value i for PSFCH with HARQ-ACK information and $M_i$, for $i > 8$, is a number of PSFCHs with priority value $i - 8$ for PSFCH with conflict information and K is defined as<br>- the largest value satisfying $P_{PSFCH,one} + 10\log_{10}(\max(1, \Sigma_{i=1}^{K} M_i)) \le P_{CMAX}$ for transmission of all PSFCHs in $\Sigma_{i=1}^{K} M_i$, if any<br>- zero, otherwise<br>and<br>$P_{PSFCH,k}(i) = \min(P_{CMAX} - 10\log_{10}(N_{Tx,PSFCH}), P_{PSFCH,one})$ [dBm]<br>where $P_{CMAX}$ is determined for the $N_{Tx,PSFCH}$ PSFCH transmissions<br>- else<br>- the UE autonomously selects $N_{max,PSFCH}$ PSFCH transmissions associated (using or configured) with the determined spatial domain transmission filter with ascending order of corresponding priority field values as described in clause 16.2.4.2 of TS 38.213<br>- if $P_{PSFCH,one} + 10\log_{10}(N_{max,PSFCH}) \le P_{CMAX}$,<br>- $N_{Tx,PSFCH} = N_{max,PSFCH}$ and $P_{PSFCH,k}(i) = P_{PSFCH,one}$ [dBm]<br>- else<br>- the UE autonomously selects $N_{Tx,PSFCH}$ PSFCH transmissions associated (using or configured) with the determined spatial domain transmission filter in ascending order of corresponding priority field values as described in clause 16.2.4.2 of TS 38.213 over the PSFCH transmissions with HARQ-ACK information, if any, and then with ascending order of priority value over the PSFCH transmissions with conflict information, if any, such that $N_{Tx,PSFCH} \ge \max(1, \Sigma_{i=1}^{K} M_i)$ where $M_i$, $1 \le i \le 8$, is a number of PSFCHs with priority value i for PSFCH with HARQ-ACK information and $M_i$, $i > 8$, is a number of PSFCHs with priority value $i - 8$ for PSFCH with conflict information and K is defined as<br>- the largest value satisfying $P_{PSFCH,one} + 10\log_{10}(\max(1, \Sigma_{i=1}^{K} M_i)) \le P_{CMAX}$ where $P_{CMAX}$ is for transmission of all PSFCHs in $\Sigma_{i=1}^{K} M_i$, if any<br>- zero, otherwise<br>and<br>$P_{PSFCH,k}(i) = \min(P_{CMAX} - 10\log_{10}(N_{Tx,PSFCH}), P_{PSFCH,one})$ [dBm]<br>where $P_{CMAX}$ is determined for the $N_{Tx,PSFCH}$ simultaneous PSFCH transmissions<br>- else<br>$P_{PSFCH,k}(i) = P_{CMAX} - 10\log_{10}(N_{Tx,PSFCH})$ [dBm]<br>where the UE autonomously determines $N_{Tx,PSFCH}$ PSFCH transmissions associated (using or configured) with the determined spatial domain transmission filter with ascending order of corresponding priority field values as described in clause 16.2.4.2 of TS 38.213 over the |

TABLE 13-continued

| PSFCH transmission |
|---|
| PSFCH transmissions with HARQ-ACK information, if any, and then with ascending order of priority value over the PSFCH transmissions with conflict information, if any, such that $N_{Tx,PSFCH} \geq 1$ and where $P_{CMAX}$ is determined for the $N_{Tx,PSFCH}$ PSFCH transmissions. |

For a PSFCH transmission or reception with HARQ-ACK information, a priority value for the PSFCH is equal to the priority value indicated by an SCI format 1-A associated with the PSFCH.

For PSFCH transmission with conflict information, a priority value for the PSFCH is equal to the smallest priority value determined by the corresponding SCI format(s) 1-A for the conflicting resource(s).

For PSFCH reception with conflict information, a priority value for the PSFCH is equal to the priority value determined by the corresponding SCI format 1-A for the conflicting resource.

In one example, a UE may transmit $N_{sch,Tx,PSFCH}$ PSFCHs and receive $N_{sch,Rx,PSFCH}$ PSFCHs, and the transmissions of the $N_{sch,Tx,PSFCH}$ PSFCHs may overlap in time with receptions of the $N_{sch,Rx,PSFCH}$ PSFCHs.

In one example, a UE determines a spatial domain transmission filter or a spatial domain reception filter, wherein: (1) the spatial domain filter for transmission or reception, if applicable, is determined based on the PSFCH corresponding to the smallest priority field value, as determined by a first set of SCI format 1-A and/or a second set of SCI format that are respectively associated with PSFCHs with HARQ-ACK information from the $N_{sch,Tx,PSFCH}$ PSFCHs and PSFCHs with HARQ-ACK information from the $N_{sch,Rx,PSFCH}$ PSFCHs when one or more of the PSFCHs provide HARQ-ACK information; and (2) if none of the $N_{sch,Tx,PSFCH}$ PSFCHs and none of the $N_{sch,Rx,PSFCH}$ PSFCHs provide HARQ-ACK information, the spatial domain filter for transmission or reception, if applicable, is determined based on the PSFCH corresponding to the smallest priority value of the first set of PSFCHs and the second set of PSFCHs that are respectively associated with the $N_{sch,Tx,PSFCH}$ PSFCHs and the $N_{sch,Rx,PSFCH}$ PSFCHs when the PSFCHs provide conflict information.

In one example, $N_{sch,Tx,PSFCH,beam}$ is the number of transmitted PSFCH using the determined spatial domain transmission filter.

In one example, $N_{sch,Rx,PSFCH,beam}$ is the number of received PSFCH using the determined spatial domain reception filter.

In one example, the UE transmits or receives only a set of PSFCHs corresponding to the smallest priority field value, as determined by a first set of SCI format 1-A and/or a second set of SCI format 1-A that are respectively associated with PSFCHs with HARQ-ACK information from the $N_{sch,Tx,PSFCH}$ PSFCHs and PSFCHs with HARQ-ACK information from the $N_{sch,Rx,PSFCH}$ PSFCHS when one or more of the PSFCHs provide HARQ-ACK information.

In one example, If none of the $N_{sch,Tx,PSFCH}$ PSFCHs and none of the $N_{sch,Rx,PSFCH}$ PSFCHs provide HARQ-ACK information, the UE transmits or receives only a set of PSFCHs corresponding to the smallest priority value of the first set of PSFCHs and the second set of PSFCHs that are respectively associated with the $N_{sch,Tx,PSFCH}$ PSFCHs and the $N_{sch,Rx,PSFCH}$ PSFCHs when the PSFCHs provide conflict information. In a variant example, the UE considers the priority of PSFCH regardless of the type of information PSFCH carriers.

In one example, if a UE may transmit $N_{sch,Tx,PSFCH}$ PSFCHs in a PSFCH transmission occasion, the UE first transmits PSFCHs with HARQ-ACK information and associated (e.g., using or configured) with the determined spatial domain transmission filter, from $N_{Tx,PSFCH}$ PSFCHS corresponding to the smallest priority field values from the $N_{Tx,PSFCH}$ priority field values, if any. Subsequently, the UE transmits remaining PSFCHs with conflict information and associated (e.g., using or configured) with the determined spatial domain transmission filter, corresponding to the smallest remaining priority field values from the $N_{Tx,PSFCH}$ priority field values, if any. In a variant example, the UE considers the priority of PSFCH regardless of the type of information PSFCH carriers.

In one example, if a UE may transmit $N_{sch,Tx,PSFCH,beam}$ PSFCHs in a PSFCH transmission occasion associated (e.g., using or configured) with the determined spatial domain transmission filter, the UE first transmits PSFCHs with HARQ-ACK information from $N_{Tx,PSFCH}$ PSFCHs corresponding to the smallest priority field values from the $N_{Tx,PSFCH}$ priority field values, if any. Subsequently, the UE transmits remaining PSFCHs with conflict information corresponding to the smallest remaining priority field values from the $N_{Tx,PSFCH}$ priority field values, if any. In a variant example, the UE considers the priority of PSFCH regardless of the type of information PSFCH carriers.

In one example, if a UE indicates a capability to receive $N_{Rx,PSFCH}$ PSFCHs in a PSFCH reception occasion, the UE first receives PSFCHs with HARQ-ACK information and associated (e.g., using or configured) with the determined spatial domain reception filter, if any, and subsequently receives PSFCHs with conflict information and associated (e.g., using or configured) with the determined spatial domain reception filter, if any. In a variant example, the UE considers the priority of PSFCH regardless of the type of information PSFCH carriers.

The present disclosure provides: (1) a determination of the DL path-loss including associated procedures and signaling; (2) a determination of the SL path-loss including associated procedures and signaling; and (3) a determination of open loop power control parameters (e.g., P0 and alpha) for a beam-based SL (e.g., PC5 interface).

The benefit of the present disclosure is that it provides design components for SL power control in a SL beam-base air interface. This beneficial for the operation of SL in FR2. The benefit of operating in FR2 is to have access to large BW for applications demanding very high data rates and throughputs.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a transceiver configured to:

receive, from a second UE, a first sidelink (SL) reference signal (RS), and receive, from the second UE, information related to a transmit power for the first SL RS; and a processor operably coupled to the transceiver, the processor configured to:

calculate a first filtered RS receive power (RSRP) for the first SL RS, calculate a first pathloss for the first SL RS based on a difference between the transmit power and the first filtered RSRP, and determine, based on the first pathloss, a first power for a first SL channel, wherein the transceiver is further configured to transmit, based on a first spatial domain transmission filter, the first SL channel using the first power, and wherein the first spatial domain transmission filter is associated with the first SL RS.

2. The UE of claim 1, wherein:

the transceiver is further configured to:

transmit a second SL RS, and receive information related to a second filtered RSRP for the second SL RS, the processor is further configured to:

calculate a second pathloss for the second SL RS based on a difference between a transmit power of the second SL RS and the second filtered RSRP, and determine, based on the second pathloss, a second power for a second SL channel, the transceiver is further configured to transmit, based on a second spatial domain transmission filter, the second SL channel using the second power, and the second spatial domain transmission filter is associated with the second SL RS.

3. The UE of claim 1, wherein the first SL RS is associated with a SL transmission configuration indication (TCI) state corresponding to the first SL channel.

4. The UE of claim 1, wherein:

the transmit power is based on a P0 value for SL pathloss based power control, and the P0 value is associated with a SL transmission configuration indication (TCI) state corresponding to the first SL channel.

5. The UE of claim 1, wherein:

the transmit power is based on an alpha value for SL pathloss based power control, and the alpha value is associated with a SL transmission configuration indication (TCI) state corresponding to the first SL channel.

6. The UE of claim 1, wherein:

the transceiver is further configured to receive a downlink (DL) pathloss RS using a spatial domain reception filter corresponding to the first spatial domain transmission filter, and the processor is further configured to determine a DL pathloss based on the DL pathloss RS.

7. The UE of claim 6, wherein:

the transmit power is based on a P0 value for DL pathloss based power control, and the P0 value is associated with the DL pathloss RS.

8. The UE of claim 6, wherein:

the transmit power is based on an alpha value for DL pathloss based power control, and the alpha value is associated with the DL pathloss RS.

9. The UE of claim 6, wherein the DL pathloss RS is a synchronization signal/physical broadcast channel (SS/PBCH) block with a largest RSRP measured using the spatial domain reception filter.

10. The UE of claim 1 wherein:

the processor is further configured to:

determine $N_{sch,Tx,PSFCH}$ physical sidelink feedback channels (PSFCHs) to be transmitted in a slot, and determine a first PSFCH with a highest priority among the $N_{sch,Tx,PSFCH}$ PSFCHs associated with a second spatial domain transmission filter, and the transceiver is further configured to transmit (i) the first PSFCH and (ii), in descending order of priority, up to $N_{Tx,PSFCH}-1$ of the $N_{sch,Tx,PSFCH}$ PSFCHs associated with the second spatial domain transmission filter.

11. A method of operating a user equipment (UE), the method comprising:

receiving, from a second UE, a first sidelink (SL) reference signal (RS);

receiving, from the second UE, information related to a transmit power for the first SL RS;

calculating a first filtered RS receive power (RSRP) for the first SL RS;

calculating a first pathloss for the first SL RS based on a difference between the transmit power and the first filtered RSRP;

determining, based on the first pathloss, a first power for a first SL channel; and transmitting based on a first spatial domain transmission filter, the first SL channel using the first power, wherein the first spatial domain transmission filter is associated with the first SL RS.

12. The method of claim 11 further comprising:

transmitting a second SL RS;

receiving information related to a second filtered RSRP for the second SL RS;

calculating a second pathloss for the second SL RS based on a difference between a transmit power of the second SL RS and the second filtered RSRP;

determining, based on the second pathloss, a second power for a second SL channel;

transmitting, based on a second spatial domain transmission filter, the second SL channel using the second power, wherein the second spatial domain transmission filter is associated with the second SL RS.

13. The method of claim 11, wherein the first SL RS is associated with a SL transmission configuration indication (TCI) state corresponding to the first SL channel.

14. The method of claim 11, wherein:

the transmit power is based on a P0 value for SL pathloss based power control, and the P0 value is associated with a SL transmission configuration indication (TCI) state corresponding to the first SL channel.

15. The method of claim 11, wherein:

the transmit power is based on an alpha value for SL pathloss based power control, and the alpha value is associated with a SL transmission configuration indication (TCI) state corresponding to the first SL channel.

16. The method of claim 11 further comprising:

receiving a downlink (DL) pathloss RS using a spatial domain reception filter corresponding to the first spatial domain transmission filter, and determining a DL pathloss based on the DL pathloss RS.

17. The method of claim 16, wherein:

the transmit power is based on a P0 value for DL pathloss based power control, and the P0 value is associated with the DL pathloss RS.

18. The method of claim 16, wherein:

the transmit power is based on an alpha value for DL pathloss based power control, and the alpha value is associated with the DL pathloss RS.

19. The method of claim 16 wherein, the DL pathloss RS is a synchronization signal/physical broadcast channel (SS/PBCH) block with a largest RSRP measured using the spatial domain reception filter.

20. The method of claim 11 further comprising:

determining $N_{sch,Tx,PSFCH}$ physical sidelink feedback channels (PSFCHs) to be transmitted in a slot, determining a first PSFCH with a highest priority among the $N_{sch,Tx,PSFCH}$ PSFCHs associated with a second spatial domain transmission filter, and transmitting (i) the first PSFCH and (ii), in descending order of priority, up to $N_{Tx,PSFCH}-1$ of $N_{sch,Tx,PSFCH}$ PSFCHs associated with the second spatial domain transmission filter.

* * * * *